(12) United States Patent
Suzuki

(10) Patent No.: US 11,055,044 B2
(45) Date of Patent: Jul. 6, 2021

(54) PRINTING APPARATUS AND METHOD FOR SETTING AND STORING PRINT JOB CONDITION

(71) Applicant: CANON KABUSHIKI KAISHA, Tokyo (JP)

(72) Inventor: Ryousuke Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/154,041

(22) Filed: Oct. 8, 2018

(65) Prior Publication Data
US 2019/0114126 A1 Apr. 18, 2019

(30) Foreign Application Priority Data
Oct. 13, 2017 (JP) .............................. JP2017-199718

(51) Int. Cl.
*G06F 3/12* (2006.01)

(52) U.S. Cl.
CPC .......... *G06F 3/1258* (2013.01); *G06F 3/1205* (2013.01); *G06F 3/1234* (2013.01); *G06F 3/1248* (2013.01); *G06F 3/1267* (2013.01); *G06F 3/1271* (2013.01); *G06F 3/1273* (2013.01); *G06F 3/1285* (2013.01); *G06F 3/1208* (2013.01); *G06F 3/1254* (2013.01)

(58) Field of Classification Search
CPC .... G06F 3/1258; G06F 3/1205; G06F 3/1248; G06F 3/1271

USPC .............................. 358/1.15, 1.13, 1.14, 1.16
See application file for complete search history.

(56) References Cited

U.S. PATENT DOCUMENTS

| | | | | |
|---|---|---|---|---|
| 2002/0126323 | A1* | 9/2002 | Dow ................... | H04N 1/00424 358/473 |
| 2003/0072031 | A1* | 4/2003 | Kuwata .............. | H04N 1/00137 358/1.15 |
| 2004/0184072 | A1* | 9/2004 | Jacobsen ............... | G06F 3/1288 358/1.15 |
| 2008/0024802 | A1* | 1/2008 | Kato ..................... | G06F 3/1205 358/1.9 |
| 2009/0094198 | A1* | 4/2009 | Monga .................... | G06F 16/90 |

FOREIGN PATENT DOCUMENTS

JP 2006-056109 A 3/2006

* cited by examiner

*Primary Examiner* — Jamares Q Washington
(74) *Attorney, Agent, or Firm* — Canon U.S.A., Inc. IP Division

(57) ABSTRACT

An image formation device configured such that printing of only some pages of print data including multiple pages is able to be designated. The device includes a first storage configured to hold print data in a page description language (PDL) format in a storage unit such that after printing has been performed not to include a specific page, further printing including the specific page is executable, and a second storage configured to hold print data in the PDL format in the storage unit such that after printing has been performed not to include the specific page, further printing including the specific page is not executable.

12 Claims, 22 Drawing Sheets

FIG. 4C

| 461 | 462 | 463 | 464 | 465 | 466 | 467 |
|---|---|---|---|---|---|---|
| DATE AND TIME | IP ADDRESS | STORAGE LOCATION | PRINT JOB NAME | PRINT SETTING | PRINT FLAG | PRINT RANGE CHANGE |
| 2016/4/10 10:34:45 | 192.168.2.11 | /data/0015/xxx | AAA.txt | SINGLE-SIDED/ ONE COPY/ MONOCHROME | NOT PRINTED | — |
| 2016/4/20 13:50:22 | 192.168.2.11 | /data/0591/yyy | BBB.pdf | DOUBLE-SIDED/ THREE COPIES/COLOR | PRINTED | FIRST TO THIRD PAGES |
| 2016/5/28 14:10:00 | 192.168.2.11 | /data/8125/zzz | CCC.doc | DOUBLE-SIDED/ FIVE COPIES/ TWO-IN-ONE/COLOR | PRINTED | NUMBER OF DEACTIVATED PAGES: TWO NUMBER OF PAGES: FIVE TO THREE |
| ... | ... | ... | ... | ... | ... | ... |

| | JOB NAME | DATE AND TIME | NUMBER OF SHEETS ×NUMBER OF COPIES | USER NAME | |
|---|---|---|---|---|---|
| ☑ 506 | Document1 | 01/01 12:00 | 5×1 | UserA | 504 |
| ☐ 507 | Document2 | 01/01 12:00 | 10×1 | UserA | 505 |
| | | | | | |

PLEASE SELECT JOB

501 WAITING FOR PRINTING  502 PRINTED  503 UPDATE

508 SELECTION NUMBER: 0  TOTAL: 0  509 ☐ SELECT ALL

510 PRINT SETTING   511 DISPLAY IMAGE   512 DELETE JOB   513 START PRINTING

<PRINT SETTING> SETTINGS UPON RECEPTION ARE BEING DISPLAYED

Document1

PAPER SIZE A4       DATE AND TIME 2017 01/01 12:00      — 551

NUMBER OF COPIES  552 [ 1 ] COPIES  [ − ]  553  [ + ] 554

PRINT RANGE          SPECIFIED PAGE(S)              [CHANGE] — 556
COLOR SELECTION   COLOR                                   — 555  [CHANGE] — 557
DOUBLE-SIDED PRINTING  NO SETTING              [CHANGE] — 558

559 CANCEL                                      560 START PRINTING

FIG. 7A

700   <PRINT RANGE> RANGE TO BE PRINTED IS SET

[ALL PAGES]   [SPECIFIED PAGE(S)]

SPECIFIED PAGE RANGE SETTING 701

STARTING PAGE   | 1 | / 5 PAGE   [ − ] [ + ]

END PAGE   | 3 | / 5 PAGE   [ − ] [ + ]

[CANCEL]   [OK]

FIG. 7B

750   <PRINT RANGE> RANGE TO BE PRINTED IS SET

[ALL PAGES]   [SPECIFIED PAGE(S)]

SPECIFIED PAGE RANGE SETTING 751

STARTING PAGE   | 1 | / 3 PAGE   [ − ] [ + ]

END PAGE   | 3 | / 3 PAGE   [ − ] [ + ]

[CANCEL]   [OK]

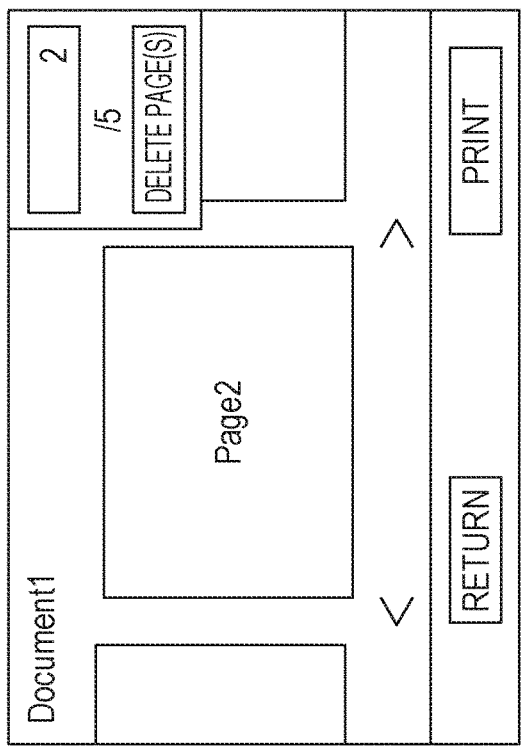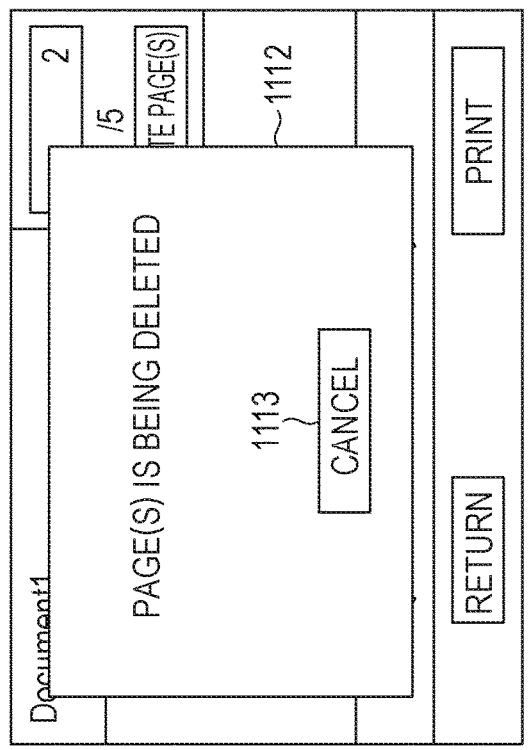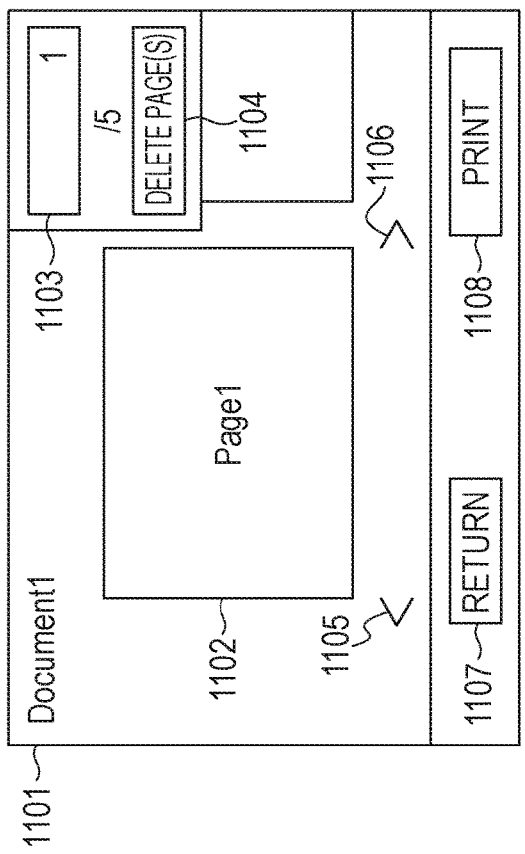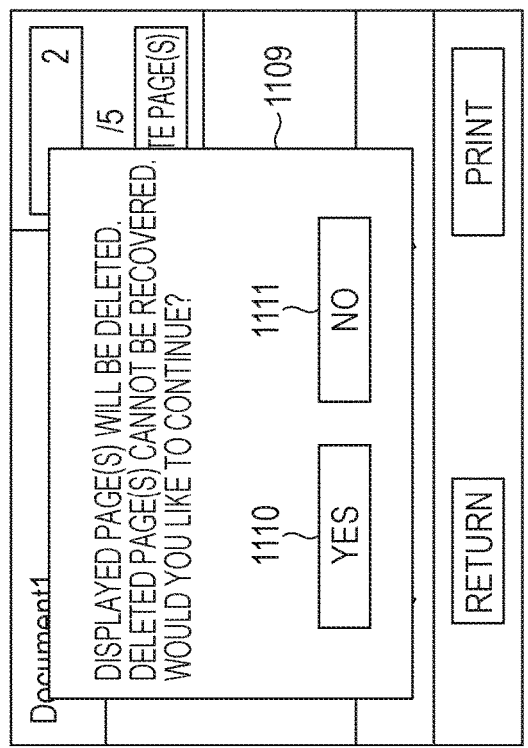

FIG. 17
1700
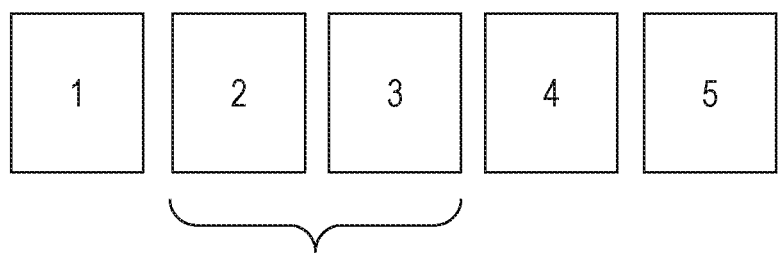
PRINT RANGE
DELETE FIRST PAGE
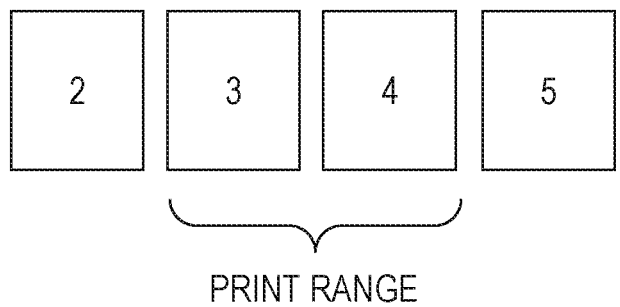
PRINT RANGE

PRINTING APPARATUS AND METHOD FOR SETTING AND STORING PRINT JOB CONDITION

BACKGROUND

Field of the Disclosure

The present disclosure generally relates image forming and, more particularly, to an image formation device configured to form an image on a sheet, a control method, and a storage medium. This image formation device can be configured, for example, as a copy machine, a printer, a FAX (facsimile), or the like.

Description of the Related Art

A printer (an image formation device) configured to form an image on a sheet based on print data has been typically known. An image formation device configured such that print data having been printed once is held to allow reprinting according to a user's instruction has been proposed as one example of the image formation device (Japanese Patent Laid-Open No. 2006-056109).

A reprint function as a utilization method for repeatedly outputting the same page range as that printed on the first try is assumed. Thus, a printer having a reprint function is preferably configured such that the page range used for first printing is also applicable upon reprinting. Thus, a method is assumed, in which setting information on the page range printed on the first try is stored, print data is held as it is, and the stored setting information is applied upon reprinting. In this method, the page range upon first printing can be easily reproduced, and settings can be changed to print a page range different from that on the first try.

However, in the above-described method, in a case where a specific page(s) to be inevitably excluded from the page range is included, it needs to be confirmed whether or not the specific page(s) is outside a print range every time the page range is changed. This causes inconvenience. For example, in a case where printing is repeatedly performed using print data including a blank page, the operation of excluding the blank page from a print range needs to be performed every time a page range is changed. For this reason, the printer having the reprint function preferably includes the function of permanently removing a blank page etc. such that the blank page etc. does not interrupt a print range change.

SUMMARY

The present disclosure provides an image formation device configured such that a single type of print data can be utilized for repeated printing with a print page range being changed and that a specific page(s) can be excluded from a changed page range.

According to one or more aspects of the present disclosure, an image formation device configured such that printing of only some pages of print data including multiple pages is able to be designated includes a first storage configured to hold print data in a page description language (PDL) format in a storage unit such that after printing has been performed not to include a specific page, further printing including the specific page is executable, and a second storage configured to hold print data in the PDL format in the storage unit such that after printing has been performed not to include the specific page, further printing including the specific page is not executable.

Further features and aspects of the present disclosure will become apparent from the following description of exemplary embodiments (with reference to the attached drawings).

BRIEF DESCRIPTION OF THE DRAWINGS

FIG. 4C is a table of a configuration of a job management list.

FIG. 5A is a view of a job list screen, and FIG. 5B is a view of a print setting screen.

FIG. 7A is a view of a print range setting screen in a second utilization case, and FIG. 7B is a view of a print range setting screen in a third utilization case.

FIGS. 11A to 11D are views of a preview screen.

FIG. 17 is a diagram of a problem in the case of applying both of page deletion and print range specification.

DESCRIPTION OF THE EMBODIMENTS

Hereinafter, various exemplary embodiments, features, and aspects of the present disclosure will be described in detail with reference to the accompanying drawings. Note that the scope of the present disclosure is not limited only to configurations described in the embodiments. Part or all of the configurations in the embodiments may be replaced with equivalents within a scope where similar advantageous effects are obtained.

First Embodiment

[Printing System]

Figure 1A:
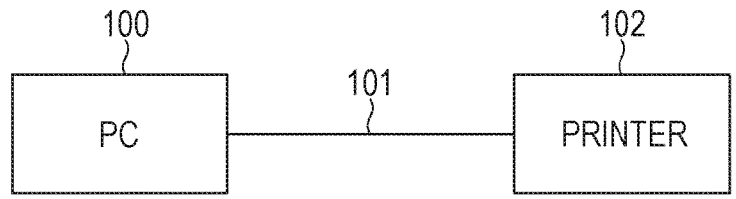
FIG. 1A is a diagram of a configuration of a printing system.

In a first embodiment, a printing system 1 will be described by way of example. FIG. 1A is a diagram of a configuration of the printing system. As illustrated in FIG. 1A, the printing system 1 may include a personal computer (PC) 100 and a printer 102. The PC 100 and the printer 102 may be communicably connected with each other via a network 101.

The PC 100 is an example of an information processing device configured such that document information or image information is processable. Other exemplary information processing configurations that may be applied to the present disclosure include, for example, a smartphone, tablet terminal, camera, or the like. The information processing device may include a controller (not shown) that may include a central processing unit (CPU), and may be configured to execute a program to implement functions of a document application or a printer driver.

The printer 102 may be an image formation device configured such that an image is formable on a sheet (paper). The printer 102 may be a printer device called multifunction printer (MFP) or single function printer (SFP).

Figure 1B:
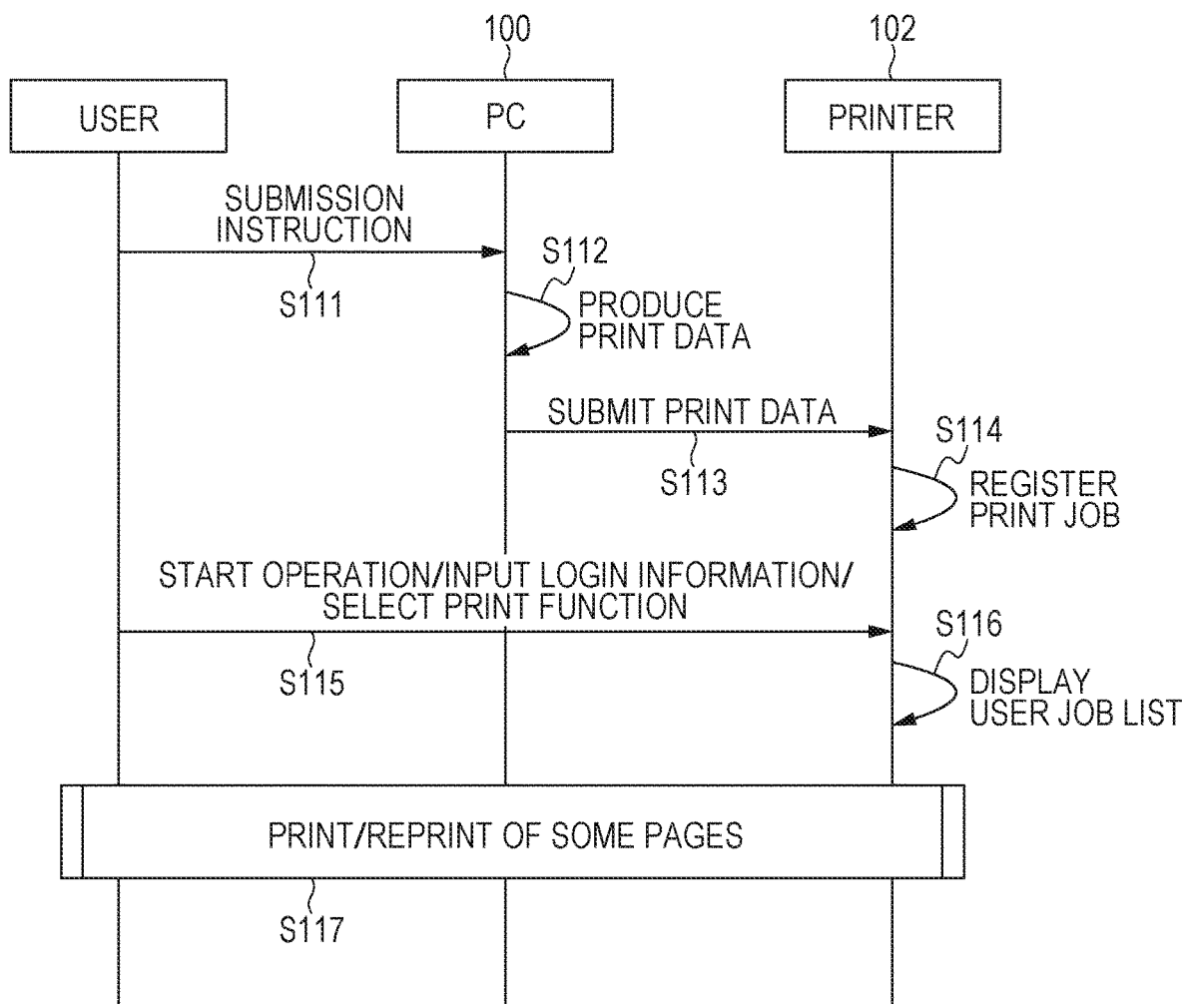
FIG. 1B is a sequence diagram of the printing system.

FIG. 1B is a sequence diagram of the printing system. As illustrated in FIG. 1B, the printing system 1 implements print processing as follows. Note that processing executed by the PC 100 may be implemented by the controller included in the PC, and each type of processing executed by the printer 102 may be implemented by a controller 310 included in the printer 102.

In the case of performing a series of print processing, the PC 100 first receives a submission instruction from a user (S110), and generates print data (S112). Thereafter, the PC 100 transmits (submits) the generated print data to the printer 102 (S113). When the print data is submitted, the printer 102 saves the received print data. Then, bibliographic information acquired from the print data is registered. In this manner, a print job is registered so that printing can be executed upon a user's printing instruction (S114). Thereafter, the user starts operation of the printer 102. The printer 102 receives input of login information by the user, and executes login processing. Then, when a print function is selected by the user after login, the printer 102 causes an operation panel 320 to display a login user job list (S116). Thereafter, the processing of printing some pages or subsequent reprint processing is performed according to each utilization case (S117).

Figure 2A:
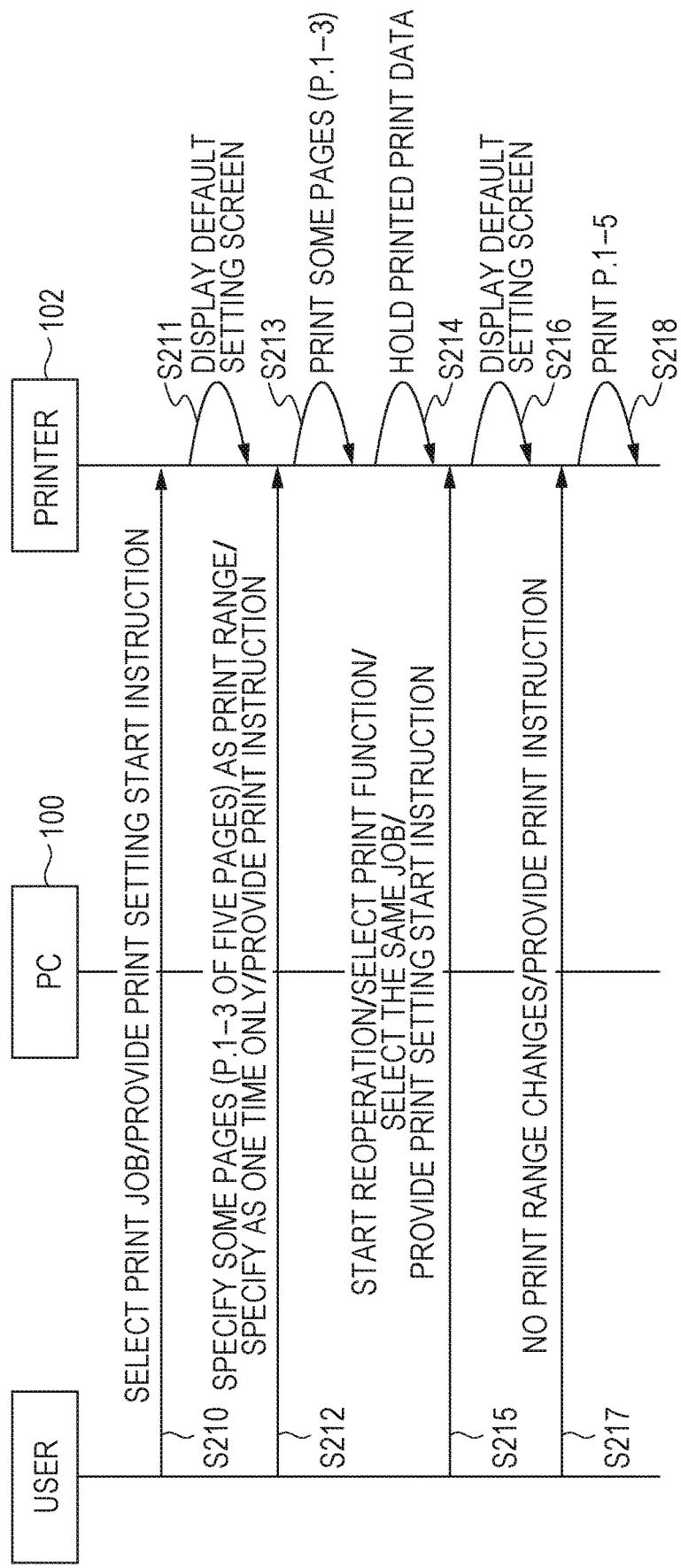
FIG. 2A is a chart of a first utilization case.
Figure 2B:
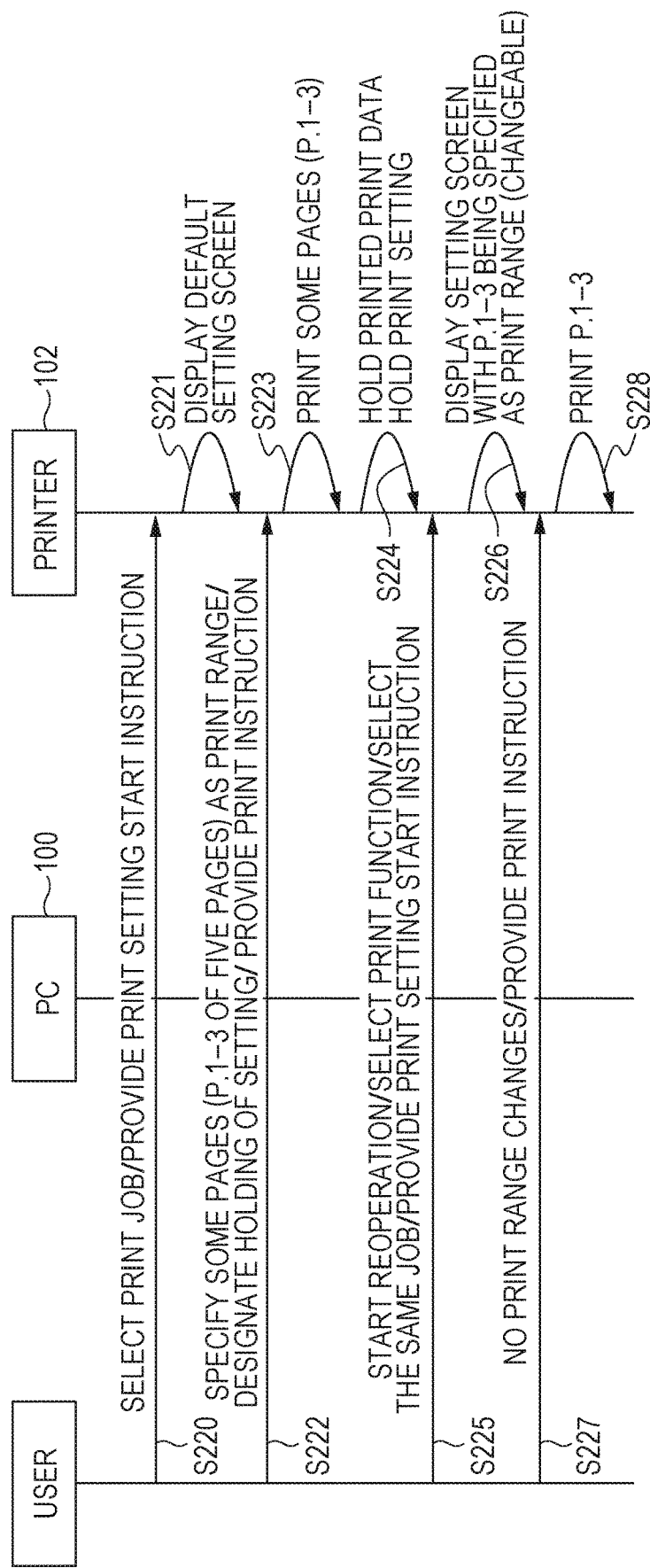
FIG. 2B is a chart of a second utilization case.
Figure 2C:
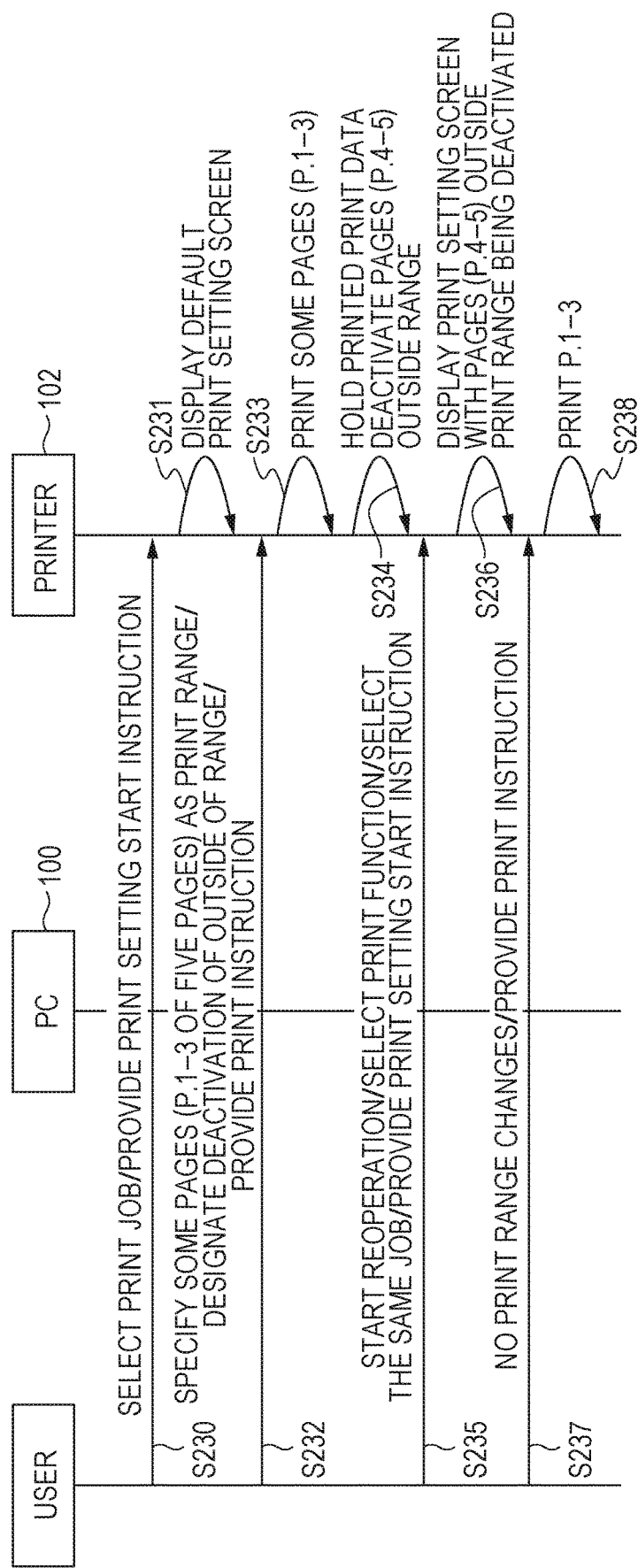
FIG. 2C is a chart of a third utilization case.

The utilization cases include first, second, and third utilization cases. FIG. 2A is a chart of the first utilization case. FIG. 2B is a chart of the second utilization case. FIG. 2C is a chart of the third utilization case.

In the first utilization case, print range specification is applied for the print job one time only. Thus, when the same print job is reprinted without a change in print settings, all pages are printed. Hereinafter, details will be described with reference to FIG. 2A.

At S117, the user first selects, in the first utilization case, the print job and provides a print range specification start instruction, and the printer 102 receives such an instruction (S210). The printer 102 causes the operation panel 320 to display a default print range specification screen (S211). The user specifies some pages (e.g., p. 1 to 3) as a print range. Then, one-time-only application of the specified print range is designated (S212). Thereafter, when a print instruction is provided, the printer 102 prints some pages (e.g., p. 1 to 3) (S213). The printed print data is held thereafter (S214). Thereafter, the user starts reoperation. Then, the print function is selected, and the same job as that printed previously is selected to provide the print range specification start instruction (S215). Then, as in S211, the printer 102 displays the default print range specification screen (S216). Thereafter, when the print instruction is started without the print range being changed by the user (S217), all pages (p. 1 to 5) of five pages are printed (S218).

In the second utilization case, the specified print range is continuously applied to the print job. Thus, in a case where the same print job is reprinted without a change in the print settings, the print range specified and utilized for first printing is applied. Hereinafter, details will be described with reference to FIG. 2B.

At S117, the user first selects, in the second utilization case, the print job and provides the print range specification start instruction, and the printer 102 receives such an instruction (S220). The printer 102 causes the operation panel 320 to display the default print range specification screen (S221). The user specifies some pages (e.g., p. 1 to 3) as the print range. Then, holding of application of the specified print range is designated (S222). Thereafter, when the print instruction is provided, the printer 102 prints some pages (e.g., p. 1 to 3) (S223). The printed print data is held thereafter. Moreover, the settings of the specified print range are also held (S224). Thereafter, the user starts reoperation. Then, the print function is selected, the same job as that printed previously is selected, and the print range specification start instruction is provided (S225). Then, the printer 102 causes the operation panel 320 to display a screen on which previously-specified some pages (e.g., p. 1 to 3) are specified (S226). Note that the specified print range is changeable within p. 1 to 5 on this screen. Thereafter, when the print instruction is started without the print range being changed by the user (S227), all pages (p. 1 to 3) of five pages are printed (S228).

In the third utilization case, print data processing is performed based on the specified print range. By print data processing, the page(s) outside the specified print range is deactivated irreversibly. Thus, in a case where the same print job is reprinted without a change in the print settings, the specified print range utilized for first printing is applied. Hereinafter, details will be described with reference to FIG. 2C.

At S117, the user first selects, in the third utilization case, the print job and provides the print range specification start instruction, and the printer 102 receives such an instruction (S230). The printer 102 causes the operation panel 320 to display the default print range specification screen (S221). The user specifies some pages (e.g., p. 1 to 3) as the print range. Then, deactivation of the pages outside the print range is designated (S232). Thereafter, when the print instruction is provided, the printer 102 prints some pages (e.g., p. 1 to 3) (S233). The printed print data is held with the pages outside the print range being deactivated (S234). Thereafter, the user starts reoperation. Then, the print function is selected, the same job as that printed previously is selected, and the print range specification start instruction is provided (S235). Then, the printer 102 displays, in a deactivated state, other pages than the pages specified previously. Note that the specified print range is changeable within p. 1 to 3 on this screen. In other words, p. 4 and 5 cannot be recovered. Thereafter, when the user starts the print instruction without a change in the print range (S237), all pages (p. 1 to 3) of three pages are printed (S238).

[Image Formation Device]

Figure 3A:
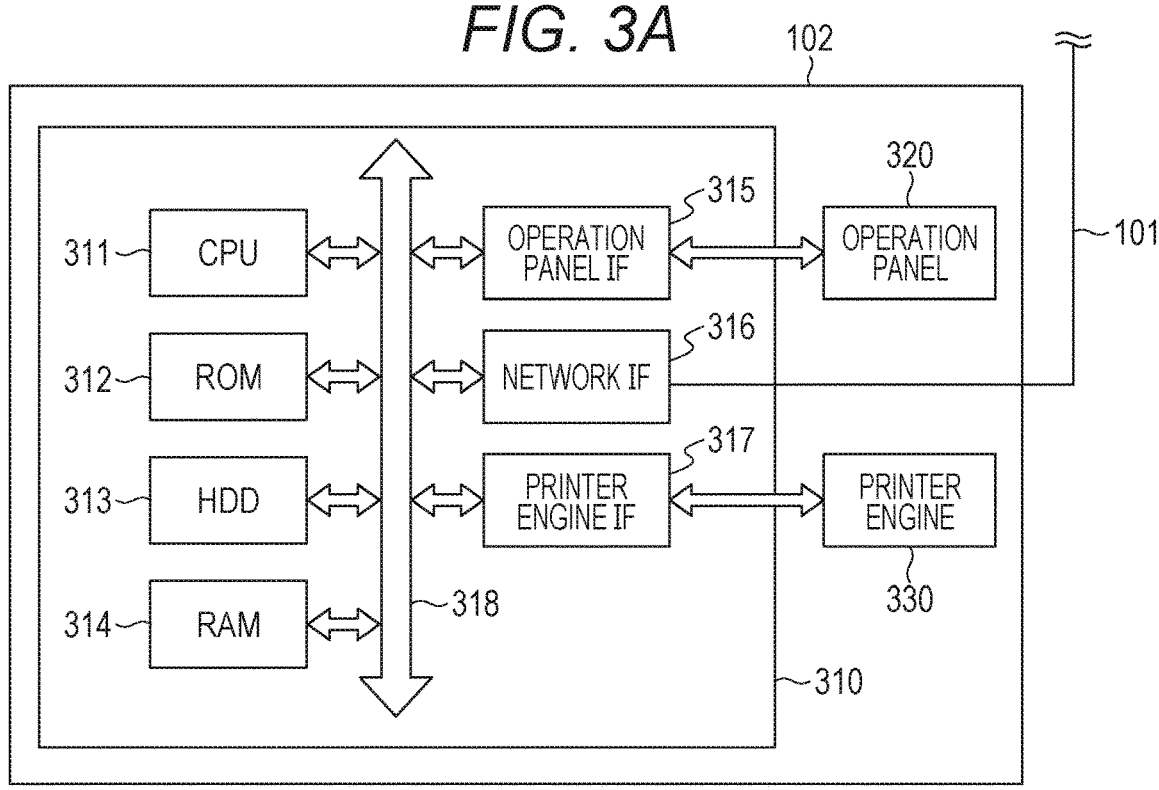
FIG. 3A is a diagram of a configuration of an image formation device.

The printer 102 as the image formation device of the present embodiment will be described in detail. FIG. 3A is a diagram of a configuration of the image formation device. As illustrated in FIG. 3A, the printer 102 includes a controller 310, the operation panel 320, and a printer engine 330.

The operation panel 320 is a user interface (an operation unit) used for operating the printer 102 by the user. The operation panel 320 includes a display as a display unit configured to display (output) information. The operation panel 320 includes a hardware key (button) or a touch screen as an input unit configured to receive input operation from the user.

The printer engine 330 is an image formation unit configured to form an image on a sheet. The printer engine 330 may be an electrophotographic device or an inkjet device.

The controller 310 may be a control unit configured to perform overall control of each configuration of the printer 102. The controller 310 may include a CPU 311, a read only memory (ROM) 312, a hard disk drive (HDD) 313, a random access memory (RAM) 314, an operation panel IF 315, a network IF 316, and a printer engine interface (IF) 317. The configurations in the controller 310 may be communicably connected with each other via a bus 318.

The CPU 311, which may include one or more processors, one or more memories, circuitry, or a combination thereof, may be configured to perform overall control of each device connected with the system bus 318 based on a program stored in the ROM 312 or the RAM 314. The ROM 312 or the HDD 313 may be configured to store an operating system (hereinafter referred to as "OS") as a control program of the CPU 311 and programs for performing various types of processing as described later. Moreover, the HDD 313 may be configured to store document data for the print processing and various types of data used upon processing. The RAM 314 functions as, e.g., a main memory or a work area of the CPU 311. The operation panel IF 315 is configured to control information input to the operation panel and information output from the operation panel. The network IF 316 is connected to the network 101 to input information to the PC 100 and output information from the PC 100, for example. The printer engine IF 317 is configured to control input of image data or a control signal to the printer engine 330 and output of the image data or the control signal from the printer engine 330

Figure 3B:
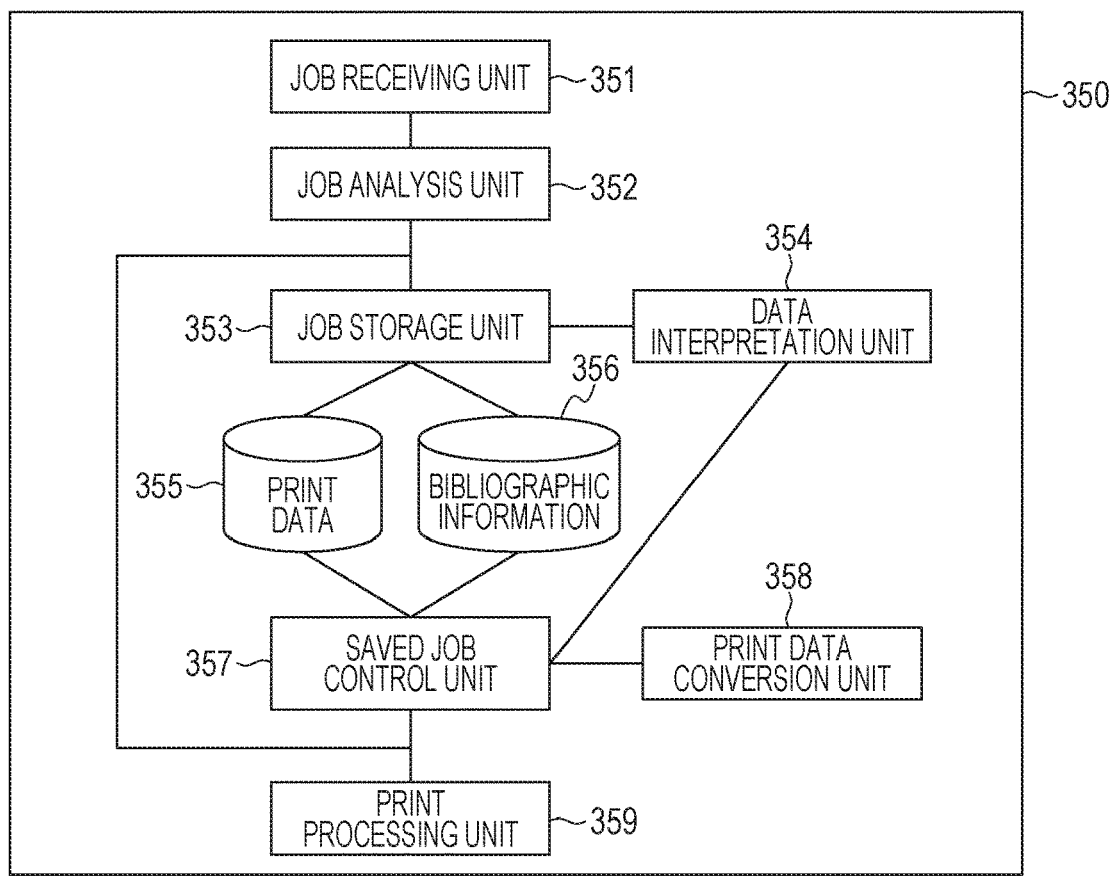
FIG. 3B is a diagram of a software configuration of the image formation device.

By execution of one or more programs, the controller 310 may be implemented as software 350. FIG. 3B is a diagram of a software configuration of the image formation device. As illustrated in FIG. 3B, the software 350 may include modules such as a job receiving unit 351, a job analysis unit 352, a job storage unit 353, a data interpretation unit 354, a saved job control unit 357, a print data conversion unit 358, and a print processing unit 359. Note that each software module of FIGS. 3A and 3B may be stored as a file in the HDD 313, may be loaded in the RAM 314 by the OS or other software modules, and executed by the CPU 311. In other words, the controller 310 may function as various functional sections (functional units, modules) described above.

The job receiving unit 351 is configured to execute the processing of receiving the print job transferred from the not-shown information processing device via the network IF 316. A communication protocol for receiving the print job is LPR or RAW, for example. The print job received by the job receiving unit 351 is in various formats. For example, the print job may be received in such a format that a job control command is provided to a page description language (PDL) such as LIPS or PostScript. Details of the print job received by the job receiving unit 351 will be described later. The print job received by the job receiving unit 351 is temporarily stored in the RAM 314.

The job analysis unit 352 is connected to the job receiving unit 351 to determine whether the received print job is to be notified to the job storage unit 353 or the print processing unit 359. Such determination is made based on a set value set in advance in the HDD 313, information set for the control command for the print job stored in the RAM 314 by the job receiving unit 351, and a transfer source communication parameter (e.g., an IP address). Thus, the job analysis unit 352 can interpret at least the job control command included in the print job. Note that such determination does not necessarily wait until data of all print jobs is received by the job receiving unit 351, and needless to say, may be made when a control command portion is received.

The job storage unit 353 is configured to save, as print data (355), the print job received by the job receiving unit 351 in the HDD 313. Moreover, the job storage unit 353 is configured to analyze print data information by means of the data interpretation unit 354, thereby producing bibliographic information (356) on which an analysis result is recorded. The bibliographic information includes information for specifying the print data saved in the HDD 313. The job storage unit 353 also saves the bibliographic information in the HDD 313. Note that the bibliographic information may be preferably saved in the HDD 313 in a data structure searchable at high speed by the later-described saved job control unit 357.

The data interpretation unit 354 is configured to interpret the print data to extract information on part of the print data included in the above-described bibliographic information. The extracted information described herein includes, for example, a job name, job owner information, a page number, the number of copies, and color information included in the print job. Moreover, the data interpretation unit 354 is configured to extract the print settings changeable by the later-described print data conversion unit 358. Such print settings include, for example, a print range setting, a color setting, and a double-sided print setting. The data interpretation unit 354 may extract not only the job control command, but also may interpret PDL data to extract print job information.

The saved job control unit 357 is configured to display, based on input from the operation panel IF 315, a user interface screen including multiple pieces of bibliographic information saved in the HDD 313 on a display device connected to the operation panel IF 315. Moreover, the saved job control unit 357 may display a user interface screen (e.g., a login screen including a user ID and a password) for login by the user before the user interface screen is displayed. Alternatively, the saved job control unit 357 may specify the user by card authentication utilizing, e.g., RFID. In a case where user information can be specified, the saved job control unit 357 selects information from multiple pieces of bibliographic information saved in the HDD 313 based on the specified user information, thereby displaying such information on the user interface screen. On the user interface screen displayed by the saved job control unit 357, at least one piece of bibliographic information is selected so that, e.g., the start of printing of the print data corresponding to such bibliographic information can be instructed. Moreover, the saved job control unit 357 transmits the print data to the print processing unit 359. Further, the saved job control unit 357 can change the print data by the later-described print data conversion unit 358 before transmission of the print data to the print processing unit 359, and then, can transmit such data. Further, the saved job control unit 357 updates the corresponding bibliographic information based on the information changed by the print data conversion unit 358. In addition, the saved job control unit 357 can overwrite the print data changed by the print data conversion unit 358 in the HDD 313. Processing performed by the saved job control unit 357 will be described in detail later.

The print data conversion unit 358 is configured to perform the processing of converting the print data based on the received print data and print setting information. The converted print data is temporarily stored in the RAM 314 or the HDD 313.

The print processing unit 359 is configured to perform the print processing in such a manner that rasterizing processing for the print data notified from the job analysis unit 352 or the saved job control unit 357 is performed to transmit a generated bitmap to the not-shown printer engine via the printer engine IF 317.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

[Print Job]

Figure 4A:
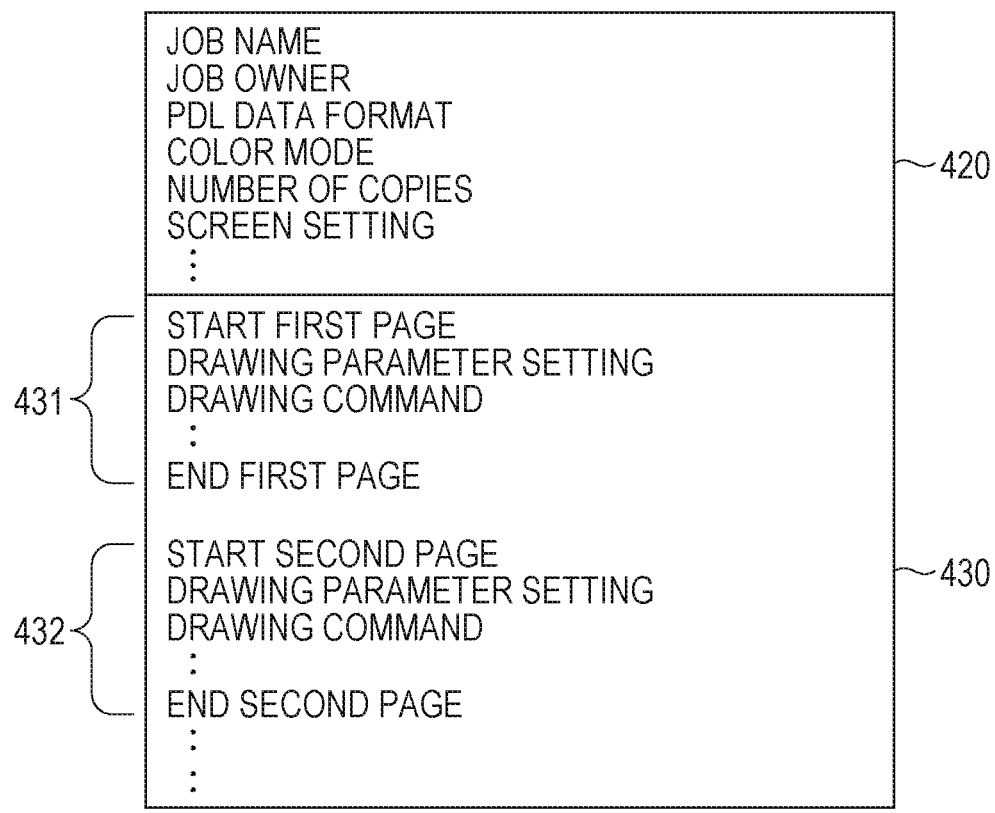
FIG. 4A is a view of a configuration of print data.

FIG. 4A is a view of a configuration of the print data (or the job received by the job receiving unit 351) saved in the HDD 313. Print data 410 includes a job control command portion 420 and a PDL portion 430. In the job control command portion 420, attributes and print settings regarding the entirety of the print job are described. For example, the job name of the print job, the job owner, and format information on the PDL portion 430 are described. Moreover, the job control command describes the print settings of the print job. For example, the number of copies and the double-sided setting are described. In the PDL portion 430, a setting command for a drawing parameter for setting, e.g., a font to be utilized, a drawing command, a page feed command, etc. are typically described. The data interpretation unit 354 counts the number of page feed commands in the PDL portion 430, thereby calculating the number of pages included in the print data. Moreover, the print data conversion unit 358 converts the job control command portion 420 or the PDL portion 430 based on the contents targeted for a conversion instruction.

Figure 4B:
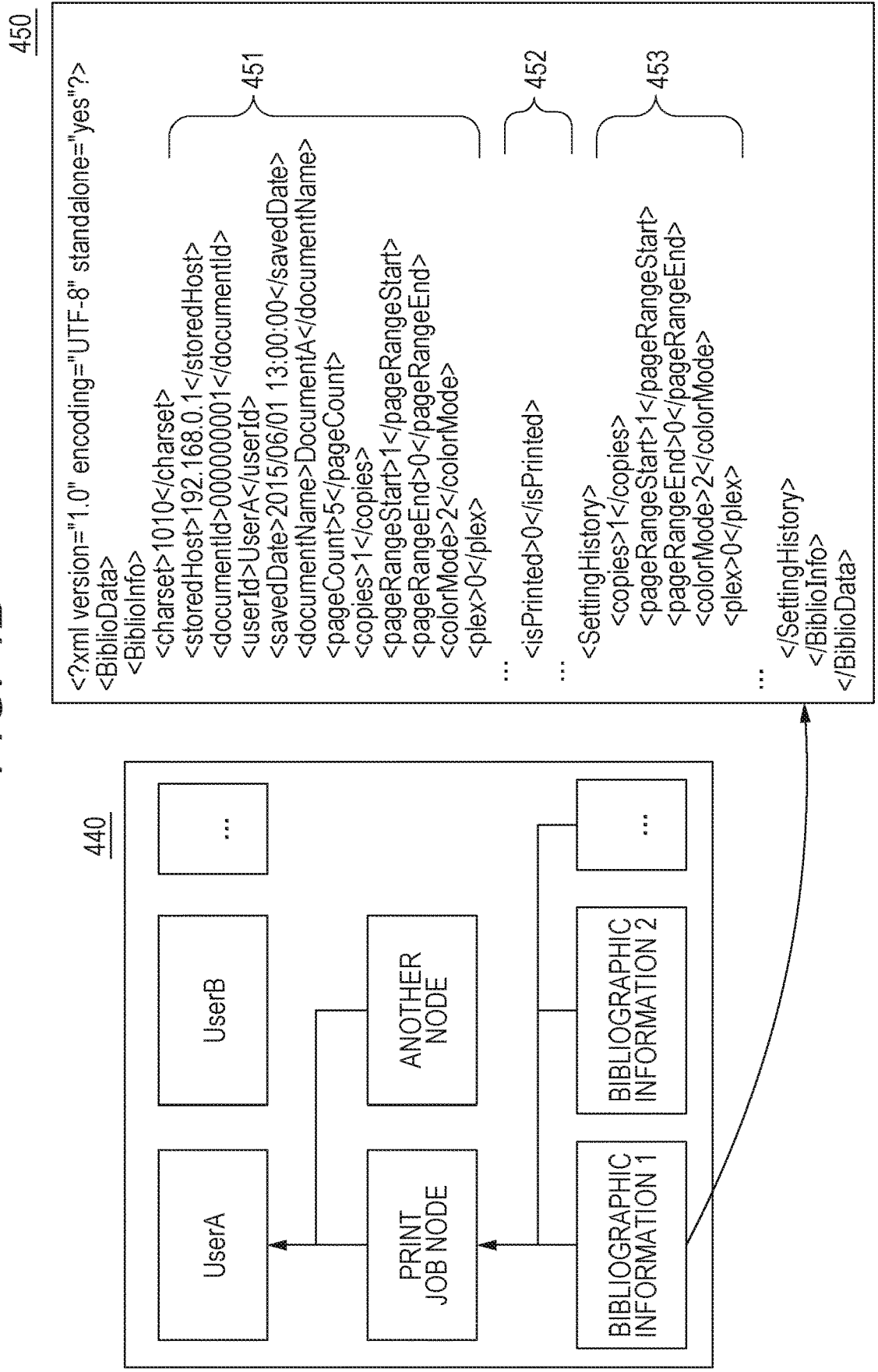
FIG. 4B is a view of a configuration of bibliographic information.

FIG. 4B is a view of a configuration of the bibliographic information. FIG. 4B illustrates one example of the data structure upon storage of the bibliographic information in the HDD 313 and one example of the bibliographic information in an XML format. In the present embodiment, the bibliographic information is saved in the HDD 313 as a tree structure having a user name as a root and having the bibliographic information as a leaf. The user name described herein is the job owner information itself or part thereof in the job control command or a character string uniquely allocated to each type of owner information in advance. The job storage unit 353 determines the user name based on the owner information extracted by the data interpretation unit 354, and saves the bibliographic information in a proper node. Bibliographic information 450 is one example of the bibliographic information in the XML format. 451 is part of the print data information extracted by the data interpretation unit 354. 451 includes at least a print setting convertible by the print data conversion unit 358. 452 includes the status (e.g., whether printing has been executed or printing is not executed yet) of the print data indicated by the bibliographic information. 453 is print setting history information on an extracted print setting convertible by the print data conversion unit 358 among print settings set when the corresponding print data was printed previously. The print setting history information is an initial set value for print setting when the print data corresponding to the bibliographic information is reprinted. Note that in some cases, information which may be described in 451 of the bibliographic information is not described in the print job received by the job receiving unit 351. In this case, the job analysis unit 352 determines information for 451 of the bibliographic information.

FIG. 4C is a table of a configuration of a job management list. FIG. 4C illustrates, in a table format, the bibliographic information described with reference to FIG. 4B.

A bibliographic table 460 is a table for registering various types of information on the acquired print data. The bibliographic table 460 includes a date-and-time field 461, an IP address field 462, a storage location field 463, a print job name field 464, a print setting field 465, a print flag field 466, and a print range change field 467. The date and time of receiving the print data are stored in the date-and-time field 461. Print data transmission source information is stored in the IP address field 462. A print data storage destination path is stored in the storage location field 463. The job name acquired from the job control command portion 420 is stored in the print job name field 464. The print setting information acquired from the job control command portion 420 is stored in the print setting field 465. Flag information indicating whether or not printing has been already performed once is stored in the print flag field 466. Print range change information is stored in the print range change field 467.

[Operation Screen]

Next, an operation screen displayed on the operation panel 320 will be described. Note that selection buttons (selection objects, software keys) are arranged on each operation screen, and various types of processing are executed by this selection buttons.

FIG. 5A is a view of a job list screen. A selection screen 500 is a screen for selecting the print job. The selection screen 500 includes a button 501, a button 502, a button 503, job information 504, job information 505, a check box 506, a check box 507, information 508, a button 509, a button 510, a button 511, a button 512, and a button 513.

The button 501 and the button 502 are buttons for switching the print job displayed on the selection screen 500. The button 501 is a button for displaying a list of non-printed print jobs, and the button 502 is a button for displaying a list of printed print jobs. The button 503 is a button for displaying print job status information. The job information 504 and the job information 505 indicate the print job information. The job information 504 and the job information 505 include the job name of the print data described in the corresponding bibliographic information, partial information on the print data, and the check boxes 506, 507 for selecting the print data. The information 508 is an information notification portion indicating the total number of print jobs and the number of selected print jobs. The button 509 is a button for selecting all of displayed print jobs. The button 510 is a button for confirming/changing the print settings of the selected print job. The button 511 is a button for displaying a preview of the selected print job. The button 512 is a button for deleting the selected print job. The button 513 is a button for starting the processing of printing the selected print job.

FIG. 5B is a view of a print setting screen. A setting screen 550 is a screen for performing print setting for the print job selected on the selection screen 500. The job is selected on the selection screen 500, the setting screen 550 is, on the operation panel 320, displayed in association with selection of the button 510. The setting screen 550 includes job information 551, an input form 552, a button 553, a button 554, information 555, a button 556, a button 557, a button 558, a button 559, and a button 560.

The job information 551 is a region where unchangeable setting information of the print job information is displayed. The input form 552 is a form for inputting, in numbers, the "number of copies" as one of print setting items. The button 553 and the button 554 are buttons for selectively changing the "number of copies". When the button 553 is pressed, the number of copies is decreased by one. When the button 554 is pressed, the number of copies is increased by one. The information 555 is a region where currently-set print setting information is displayed. The button 556 is a button for changing the "print range" as one of the print setting items. The button 557 is a button for changing the "color setting" as one of the print setting items. The button 558 is a button for changing the "double-sided print setting" as one of the print setting items. The button 559 is a button for closing the print setting screen to end print setting. The button 560 is a button for starting the print processing for the selected print job. Note that although not shown in the figure, an aggregating setting for aggregating multiple pages into a single image (two-in-one, four-in-one, . . . , N-in-one) is also available.

Figure 6A:
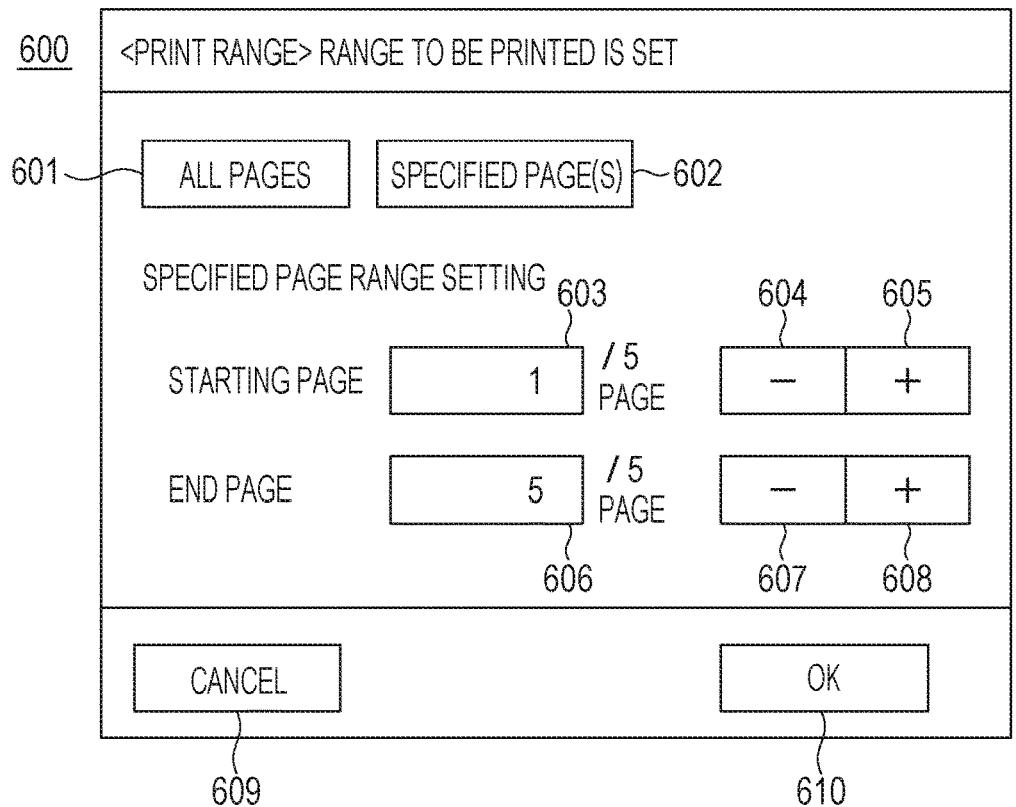
FIG. 6A is a view of a print range setting screen.

FIG. 6A is a view of a print range setting screen. A print range setting screen 600 is a screen for specifying the print range for the print job selected on the selection screen 500. The setting screen 600 is displayed on the operation panel 320 in association with selection of the button 556 on the setting screen 550. The print range setting screen 600 includes a button 601, a button 602, an input form 603, a button 604, a button 605, an input form 606, a button 607, a button 608, a button 609, and a button 610.

The button 601 is a button for specifying all pages as the print range. The button 602 is a button for specifying the print range. By pressing this button, the later-described objects 604 to 608 become operable. The button 601 is selected as a default. The input form 603 is a form for specifying a starting page of the print range. FIG. 6A illustrates such a state that the first page of the total of five pages is specified as the starting page. The button 604 and the button 605 are buttons for setting the starting page of the print range. By pressing of the button 604, the starting page is changed to a previous page by one page. By pressing of the button 605, the starting page is changed to a next page by one page. The input form 606 is a form for specifying an end page of the print range. FIG. 6A illustrates such a state that the fifth page of the total of five pages is specified as the end page. The button 607 and the button 608 are buttons for setting the end page of the print range. By pressing of the button 607, the end page is changed to a previous page by one page. By pressing of the button 605, the end page is changed to a next page by one page.

Note that input for the input form 603 or the input form 606 may be performed by a not-shown hardware keyboard connected with the operation panel IF 315. The button 609 is a button for interrupting print range setting. The button 610 is a button for determining the print range setting.

Figure 6B:
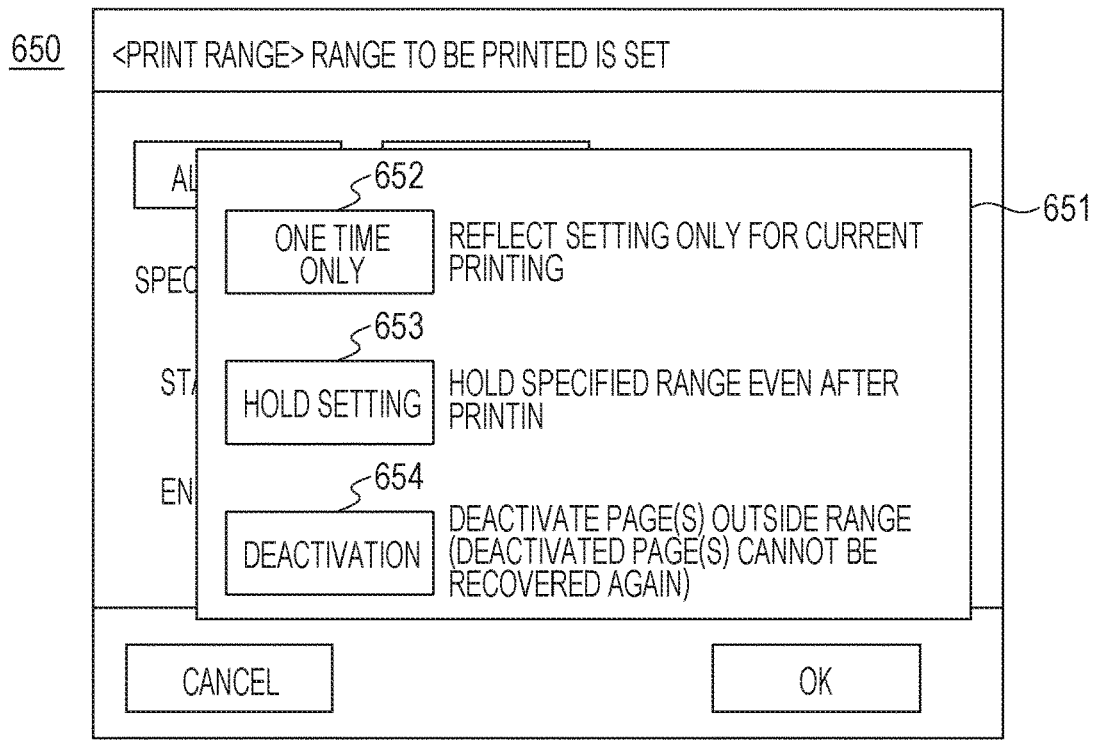
FIG. 6B is a view of a setting method confirmation screen.

FIG. 6B is a view of a setting method confirmation screen. FIG. 7A is a view of a print range setting screen in the second utilization case. FIG. 7B is a view of a print range setting screen in the third utilization case.

A screen 650 is a screen in a state in which a confirmation screen 651 is superimposed on the print range setting screen 600. The confirmation screen 651 is a screen for confirming the method for applying the contents set on the print range setting screen 600. The print range is set on the print range setting screen 600, and the confirmation screen 651 is displayed on the operation panel 320 in association with selection of the button 610. The confirmation screen 651 includes a button 652, a button 653, and a button 654.

The button 652 is a one-time-only button for performing a setting for reflecting the set and specified range only on current printing. After the first to third pages have been specified as the print range and the button 652 has been selected to perform printing, when the print range specification screen for the same job is opened, the print range specification screen is displayed in the same state as that of FIG. 6A. That is, the print range specification screen is displayed with the first page being specified as the starting page and the fifth page being specified as the end page.

The button 653 is a setting holding button for holding the contents of the specified range even after printing. After the first to third pages have been specified as the print rage and the button 653 has been selected to perform printing, when the print range specification screen for the same job is opened, the print range specification screen is displayed in a state illustrated in FIG. 7A. That is, as illustrated in a display region 701, the print range specification screen is displayed with the first page being specified as the starting page and the third page being specified as the end page. At this point, the print range specification screen is in such a state that the button 602 is selected.

The button 654 is a deactivation button for deactivating a page(s) outside the specified range. After the first to third pages have been specified as the print range and the button 654 has been selected to perform printing, when the print range specification screen for the same job is opened, the print range specification screen is displayed in a state illustrated in FIG. 7B. That is, as illustrated in a display region 751, a range which can be specified is displayed as a range of the first to third pages. At this point, the first page is specified as the starting page, and the third page is specified as the end page. Note that page deactivation is implemented in such a manner that a PDL portion 430 of target print data is edited. Specifically, as illustrated in FIG. 4A, the PDL portion 430 is described in multiple sentences surrounded by a page start command and a page end command. Thus, a specific page command is deleted so that a specific page can be deactivated. For example, in the case of deactivating the fourth and fifth pages, commands for the fourth and fifth pages are deleted.

Note that the print data held after printing is print data in the PDL format. The printer 102 can further execute printing by means of such print data. In the present embodiment, the PDL data is not edited for other functions than a page deactivation function. Thus, other print settings than page deactivation are reversible. For example, even when monochrome printing is designated for first printing, color printing can be performed for reprinting. Even when four-in-one printing is executed for first printing, one-in-one printing can be executed for reprinting.

[Control Flow]

Figure 8:
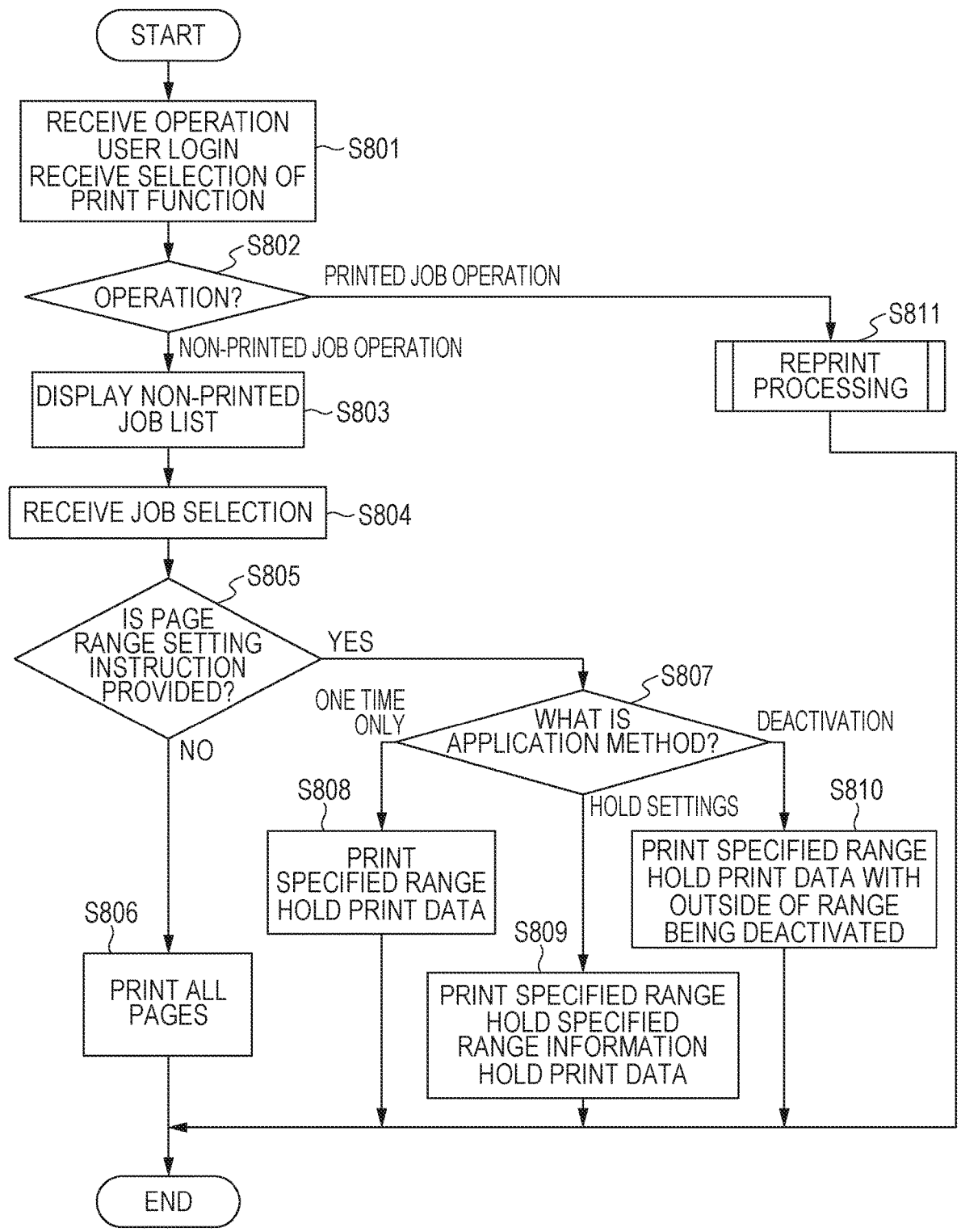
FIG. 8 is a chart of the flow of operation receiving processing.

Control of the printer 102 will be described with reference to a flow. FIG. 8 is a chart of the flow of operation receiving processing.

In the operation receiving processing, the controller 310 first detects the start of user's operation. The controller 310 having detected the start of operation causes the operation panel 320 to display an authentication screen (a login screen, not shown). When input of user authentication information is received on the authentication screen and such authentication is successful, the controller 310 causes the operation panel 320 to display a function selection screen (not shown). On the function selection screen, multiple functions included in the printer 102 are displayed. Then, the controller 310 receives selection of the print function. When the print function is selected, the controller 310 causes the operation panel 320 to display the job selection screen 500 (S801). In a case where the button 501 is selected on the job selection screen 500 to operate the job (in the case of performing non-printed job operation), the controller 310 proceeds the processing to S803 (S802: NON-PRINTED JOB). Note that the button 501 may be in a selected state as a default. In a case where the button 502 is selected on the selection screen 500 to operate the job (S802: PRINTED JOB), the controller 310 proceeds the processing to S811. At S811, the reprint processing is performed. Details of the reprint processing will be described later. When the reprint processing ends, the controller 310 ends the processing.

At S803, a non-printed job list is displayed on the operation panel 320 (S803). Then, the controller 310 receives selection of the print job (S804). Thereafter, when the print instruction is received without the page range being specified (S805: NO), the controller 310 causes the printer engine 330 to print all pages of the selected print job (S806). At this point, the print data is held as it is so that the print data is reprintable.

In a case where the page range is specified, the controller 310 confirms the method for applying the specified print range (S807).

In a case where the application method is "one time only" (S807: ONE TIME ONLY), the controller 310 causes the printer engine 330 to print the print range specified according to the print instruction. The print data used for printing is held as it is so that the reprint processing is available for the print data. No specified range information is held.

In a case where the application method is "holding of the settings" (S807: HOLD SETTINGS), the controller 310 causes the printer engine 330 to print the print range specified according to the print instruction. The print data used for printing is held as it is so that the reprint processing is available for the print data. Moreover, the specified range information is held as in FIG. 4C such that the print range is also applied for subsequent printing.

In a case where the application method is "deactivation" (S807: DEACTIVATION), the controller 310 causes the printer engine 330 to print the print range specified according to the print instruction. The print data used for printing is held with a page(s) outside the print range being deactivated. Moreover, deactivation information is held as in FIG. 4C. Note that the deactivation information is not necessarily held.

Figure 9:
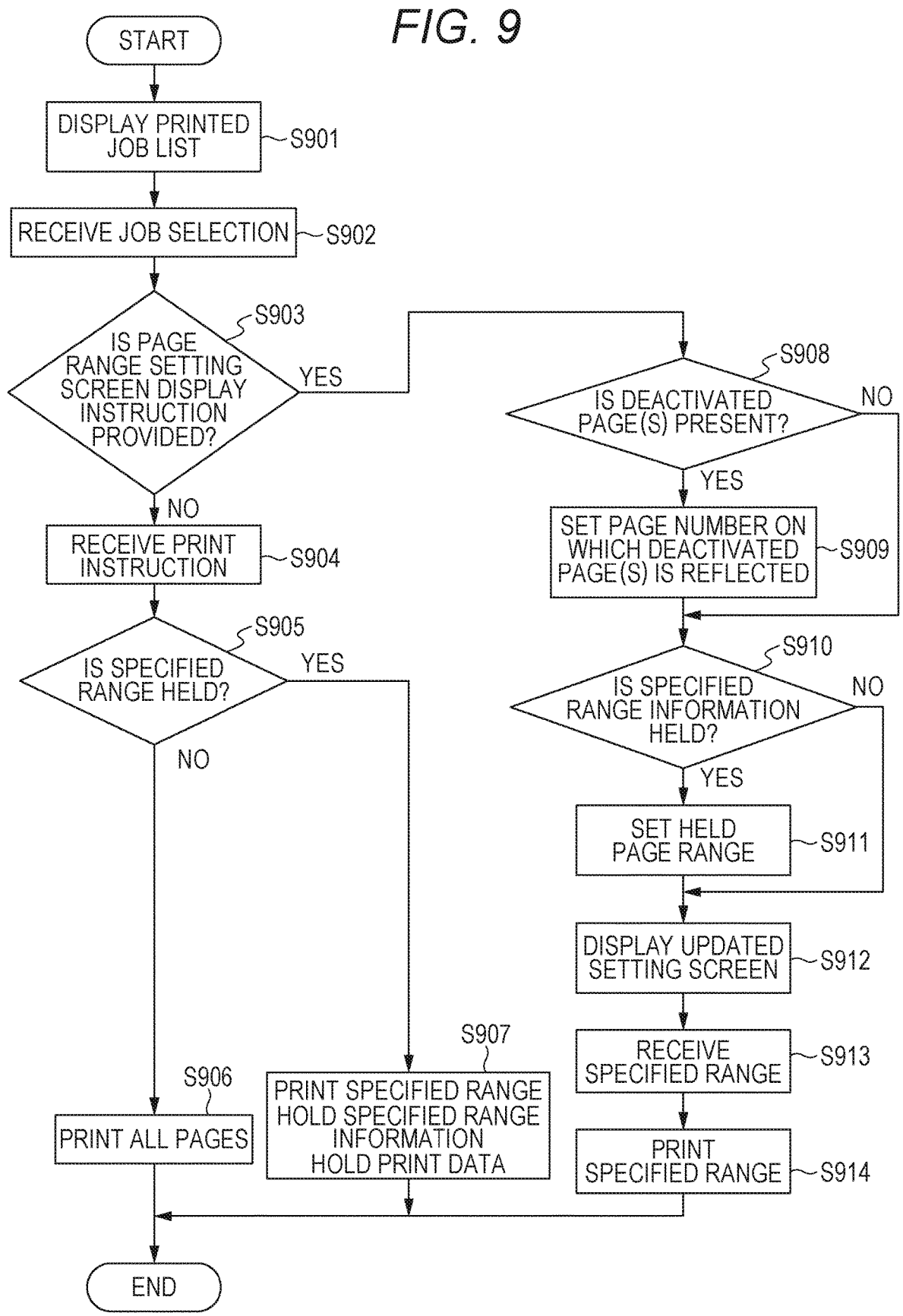
FIG. 9 is a chart of the flow of reprint processing.

The details of the reprint processing performed at S811 will be described. FIG. 9 is a chart of the flow of the reprint processing.

In the reprint processing, the printed job list is displayed on the operation panel 320 (S901). Then, the controller 310 receives selection of the print job (S902). Thereafter, when the print instruction is received (S904) without the page range being specified (S903: NO), it is confirmed whether or not there is the specified range held in the selected print job (S905). In a case where no specified range is held (S905: NO), the controller 310 causes the printer engine 330 to print all pages of the print data (S906). At this point, the print data is held as it is. In a case where the specified range is held (S905: YES), the controller 310 causes the printer engine 330 to print a range-specified page(s) of all pages of the print data (S907). At this point, the specified range information is continuously held, and the print data is also held as it is.

At S903, in a case where displaying of the print range specification screen is instructed, the controller 310 proceeds the processing to S908. At S908, the controller 310 determines whether or not the print data has a deactivated page(s). In a case there is the deactivated page(s), the number of pages obtained in such a manner that the number of deactivated pages is subtracted from the number of pages of original print data is set (S909). In a case where there is no deactivated page(s), S909 is skipped.

In a case where there is the held specified range information (S910: YES), the controller 310 sets the held print range (S911). In a case where there is no held specified range information, the controller 310 skips S911.

Then, the controller 310 displays the print range specification screen (e.g., FIG. 7A/FIG. 7B) updated based on the information set at S909 or S911. Thereafter, the controller 310 receives the specified print range (S912), prints the specified range (S913), and ends the processing.

[Advantageous Effects]

According to one or more aspects of the present disclosure, the printer 102 can hold the specified print range. Thus, a desired print range can be easily printed without the need for specifying the print range again upon reprinting.

According to one or more aspects of the present disclosure, the printer 102 can deactivate some pages. Thus, the deactivated pages are not included in the print range upon reprinting, and excellent operability in specification of the print range is exhibited.

According to one or more aspects of the present disclosure, the printer 102 holds the PDL data as the print data for reprinting. Thus, the print settings upon reprinting are not limited by the setting contents upon first printing.

According to the one or more aspects of present disclosure, the printer 102 can utilize both of the function of holding the specified print range and the function of deactivating a page(s). Thus, the user can select a function suitable for a user's purpose, leading to excellent usability.

According to the one or more aspects of present disclosure, the printer 102 can select, on one screen, which one of the function of holding the specified print range or the function of deactivating a page(s) is to be used. Thus, the function can be easily selected.

According to the one or more aspects of present disclosure, the printer 102 can select, on one screen, which one of the function of holding the specified print range or the function of deactivating a page(s) is to be used. Thus, the function can be easily selected.

Second Embodiment

In the first embodiment, the method for applying the specified print range is confirmed after the print range has been specified, and in this manner, both of the function of holding the specified print range and the page deactivation function are realized. On the other hand, in a second embodiment, the function of holding the specified print range and the page deactivation function can be set on separate screens. Similar functions are on separate pages, and therefore, the user less mixes up these functions with each other. Note that a printing system of the second embodiment is similar to that of the first embodiment, except for a configuration regarding the above-described difference. Thus, the same reference numerals are used to represent similar configurations, and detailed description thereof will be omitted.

[Printing System]

Figure 10A:
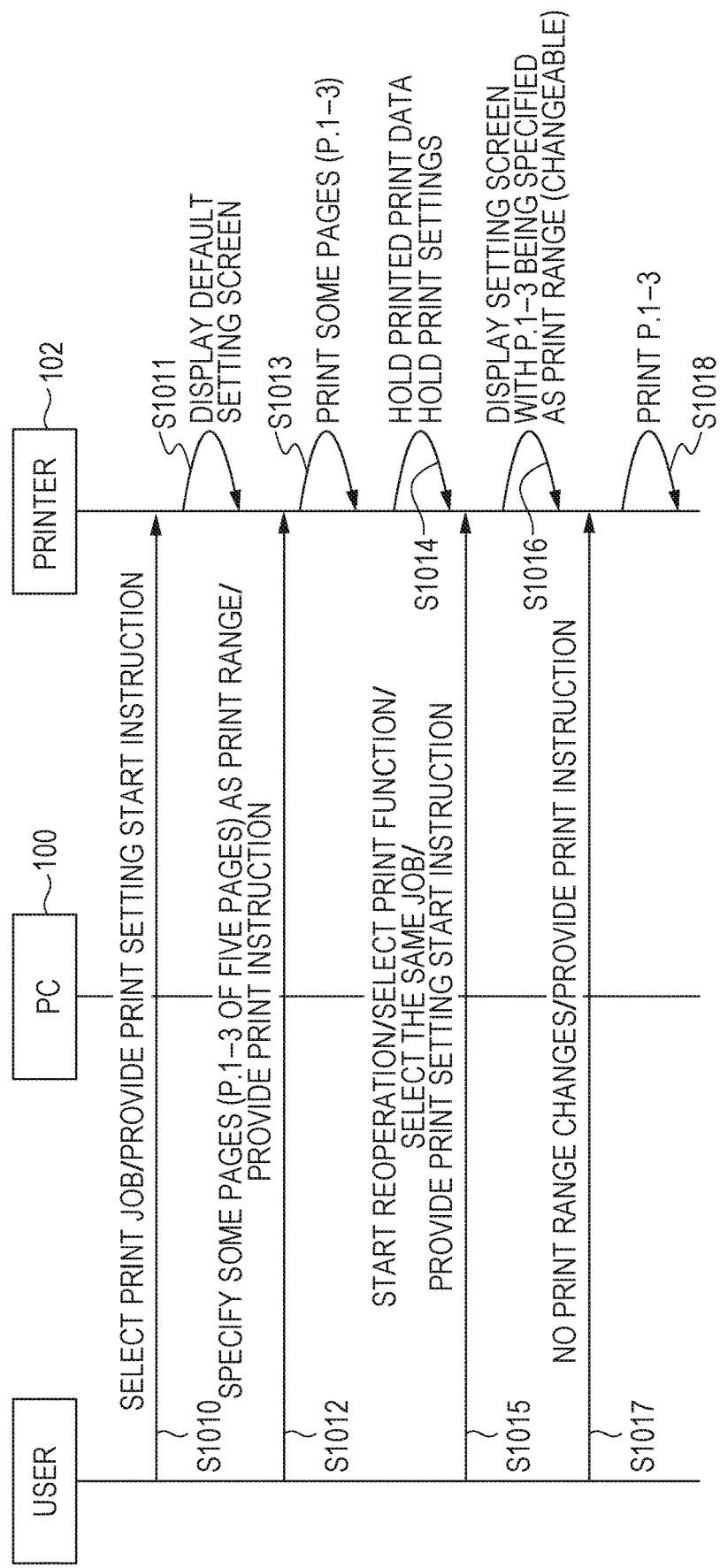
FIG. 10A is a view of a first utilization case in a second embodiment.
Figure 10B:
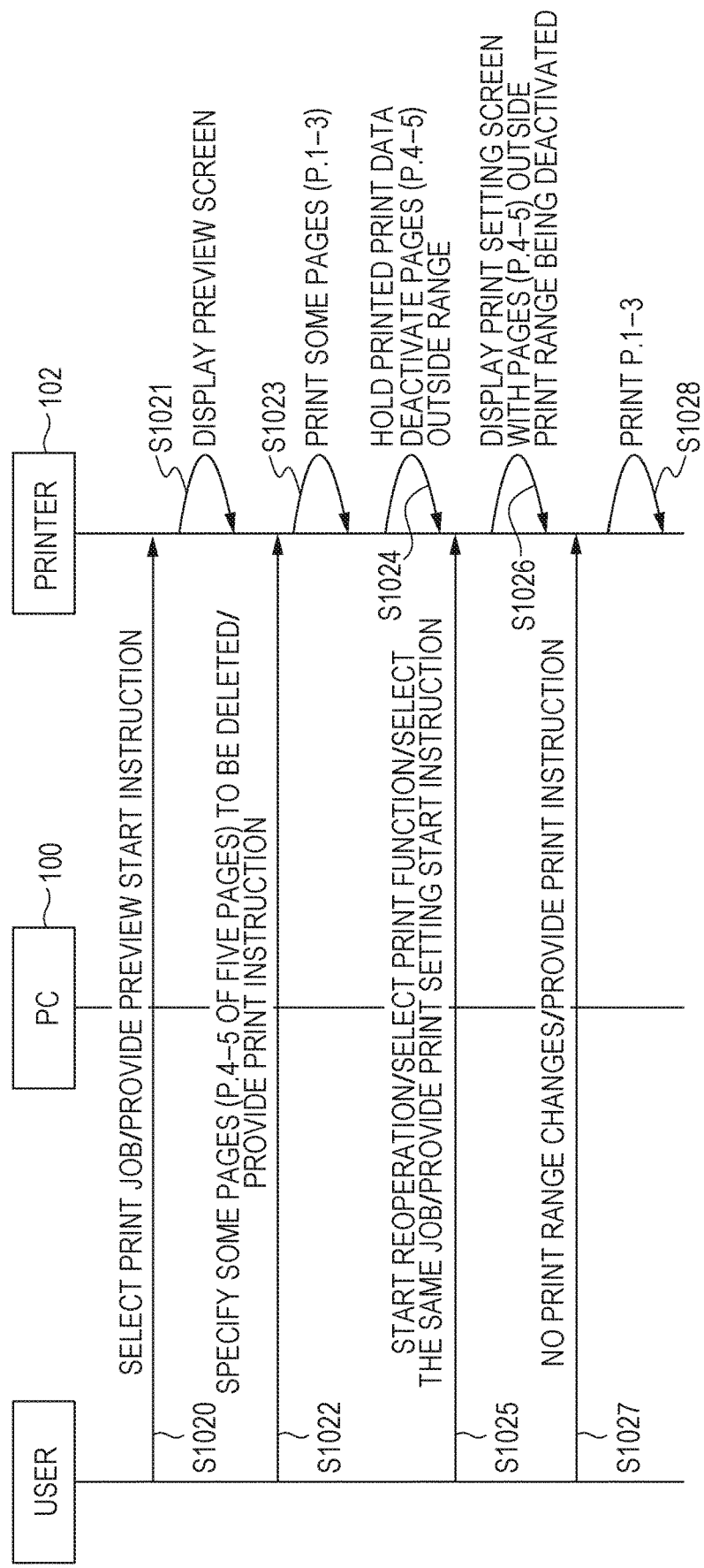
FIG. 10B is a view of a second utilization case in the second embodiment.

The printing system of the second embodiment is a printing system 1 as in the first embodiment. In the second embodiment, the printing system 1 is used as in a first utilization case and a second utilization case. FIG. 10A is a chart of the first utilization case in the second embodiment. FIG. 10B is a chart of the second utilization case in the second embodiment. Details of each utilization case will be described.

In the first utilization case, a specified print range is continuously applied to a print job. Thus, in a case where the same print job is reprinted without print settings being changed, the specified print range utilized in first printing is applied. Hereinafter, details will be described with reference to FIG. 10A.

At S117, a user first selects, in the first utilization case, the print job and provides a print range specification start instruction, and a printer 102 receives such an instruction (S1010). The printer 102 causes an operation panel 320 to display a default print range specification screen (S1011). The user specifies some pages (e.g., p. 1 to 3) as the print range (S1012). Thereafter, when a print instruction is provided, the printer 102 prints some pages (e.g., p. 1 to 3) (S1013). The printed print data is held thereafter. Moreover, the settings of the specified print range are also held (S1014). Thereafter, the user starts reoperation. Then, a print function is selected, the same job as that printed previously is selected, and the print range specification start instruction is provided (S1015). Then, the printer 102 causes the operation panel 320 to display a screen on which previously-specified some pages (e.g., p. 1 to 3) are specified (S1016). Note that the specified print range is changeable within p. 1 to 5 on this screen. Thereafter, when the print instruction is started without the print range being changed by the user (S1017), all pages (p. 1 to 3) of five pages are printed (S1018).

In the second utilization case, the print data is processed based on a deletion instruction upon previewing. By processing of the print data, the pages (the pages targeted for deletion) outside the print range are deactivated irreversibly. Thus, in a case where the same print job is reprinted without a change in the print settings, the specified print range utilized for first printing is applied. Hereinafter, details will be described with reference to FIG. 10B.

At S117, the user first selects, in the second utilization case, the print job and starts print preview, and the printer 102 receives such operation (S1020). The printer 102 causes the operation panel 320 to display a preview screen (S1021). The user specifies p. 4 and 5 to be deleted for the purpose of printing only some pages (e.g., p. 1-3) (S1022). Thereafter, when the print instruction is provided, the printer 102 prints some pages (e.g., p. 1-3) (S1023). The printed print data is held with the pages outside the print range being deactivated (S1024). Thereafter, the user starts reoperation. Then, the print function is selected, the same job as that printed previously is selected, and a print setting start instruction is provided (S1025). Then, the printer 102 displays, in a deactivated state, the pages previously specified as the pages to be deleted. Note that the specified print range is changeable within p. 1-3 on this screen. In other words, p. 4 and 5 cannot be recovered. Thereafter, when the user starts the print instruction without a change in the print range (S1027), all pages (p. 1 to 3) of three pages are printed (S1028).

[Preview Screen]

The preview screen as a screen on which a page deactivation instruction can be provided will be described. FIGS. 11A to 11D are views of the preview screen.

As illustrated in FIG. 11A, a controller 310 can cause the operation panel 320 to display a preview screen 1100. The preview screen 1100 is displayed in such a manner that the job is selected and a button 511 is selected on a selection screen 500. As illustrated in FIG. 11A, the preview screen 1100 includes information 1101, an image 1102, an input form 1103, a button 1104, a button 1105, a button 1106, a button 1107, and a button 1108.

The information 1101 is an information display portion where the job name of the print data targeted for preview is displayed. The image 1102 is a preview display portion where a page image of the print data targeted for preview is displayed. The input form 1103 is an input field for specifying a page targeted for preview. A page number corresponding to the currently-displayed preview image is displayed in the input form 1103. The button 1104 is a button for deleting the displayed page. By such a button, the page can be deactivated one by one. The button 1105 and the button 1106 are buttons for changing the displayed page. The button 1105 is a button for displaying a previous page of the currently-displayed page. The button 1106 is a button for displaying a next page of the currently-displayed page. The button 1107 is a button for closing the preview screen 1100. When the preview screen is closed, the selection screen 500 is displayed. The button 1108 is a button for printing the print data of the selected preview.

When the button 1106 is selected on the screen illustrated in FIG. 11A, the controller 310 causes the operation panel 320 to display a screen of FIG. 11B. FIG. 11B is the screen for previewing the second page as the next page of the page illustrated in FIG. 11A.

When the button 1104 is selected on the screen illustrated in FIG. 11A, the controller 310 causes the operation panel 320 to display a screen of FIG. 11C. FIG. 11C is a page deletion confirmation screen.

The screen illustrated in FIG. 11C includes a dialogue screen 1109. The dialogue screen 1109 is a confirmation screen (a warning screen) for warning/notifying the user of deletion of the print data. The dialogue screen 1109 includes a button 1110 for instructing execution of page deletion, and a button 1111 for instructing non-execution of page deletion. When the button 1110 is selected, a dialogue screen 1112 is displayed.

A screen illustrated in FIG. 11D includes the dialogue screen 1112. The dialogue screen 1112 is a dialogue screen indicating that page deletion is being executed. The dialogue screen 1112 includes a button 1113 for interrupting page deletion processing in the middle of execution thereof.

[Control Flow]

Figure 12:
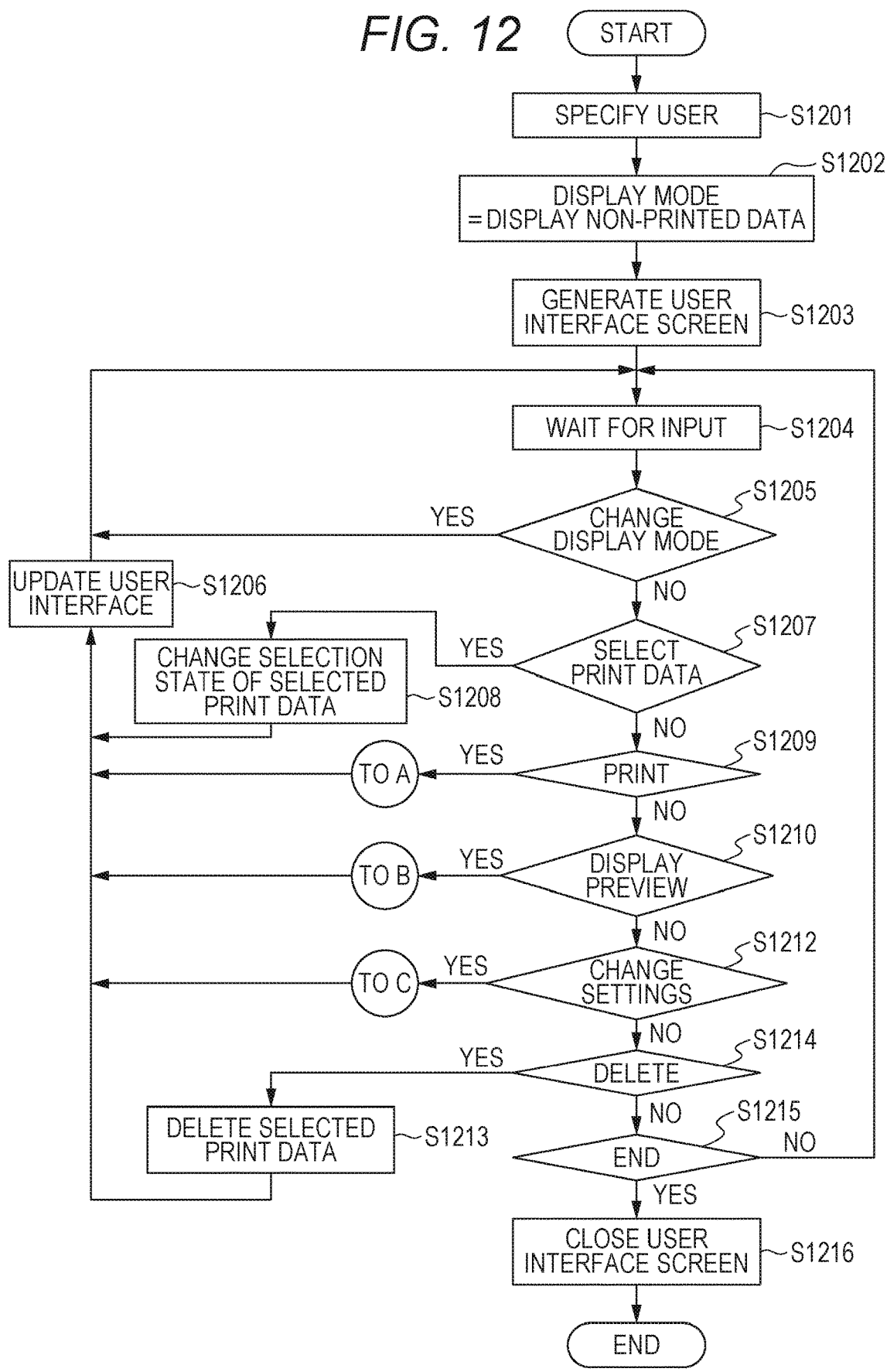
FIG. 12 is a chart of the flow for operating a print job.

As described above, in the second embodiment, the function of holding the specified print range and the page deactivation function can be utilized on separate screens. The flow of screen operation for realizing these functions will be described in detail. FIG. 12 is a chart of the flow of operation of the print job.

First, a saved job control unit 357 receives user information from an operation unit IF, thereby specifying the user (S1201). In the present embodiment, the saved job control unit 357 causes a not-shown LCD connected to the operation unit IF to display a user interface for inputting a user name and a password, and reads the information input to the user interface by the user. Subsequently, the saved job control unit 357 performs various types of setting for the print data displayed on the generated user interface (S1202). The saved job control unit 357 of the present embodiment can switch the print data displayed on the user interface between only non-printed print data and only printed print data. In the present embodiment, only the non-printed print data is initially displayed. Note that the saved job control unit 357 determines the above-described user name from the user information, which is specified at S1201, of bibliographic information saved in a HDD 313, and extracts bibliographic information corresponding to a print job node corresponding to the user name. Thereafter, from the contents described in the bibliographic information, it is determined whether or not the print data has been printed, and the job names of the bibliographic information matching conditions are extracted from the bibliographic information and are displayed. Thereafter, a user interface screen including the multiple extracted job names is generated and displayed (S1203). Subsequently, the saved job control unit 357 stands by until receiving input from an operation panel IF 315 (S1204). In a case where the input from the operation panel IF 315 is input for changing the type of displayed print data (S1205), the saved job control unit 357 switches the type of displayed print data, and then, updates the user interface screen (S1206). In a case where the input from the operation panel IF 315 is input for selecting the displayed print data (S1207), the saved job control unit 357 changes the selected print data from a non-selected state to a selected state. Alternatively, the saved job control unit 357 changes the selected print data from the selected state to the non-selected state (S1208). Then, the saved job control unit 357 updates the user interface screen. The state of the print data is held in a RAM 314 until the user interface screen displayed by the saved job control unit 357 ends. A case where the input from the operation panel IF 315 is input for printing the print data in the selected state (S1209) will be described later. A case where the input from the operation panel IF 315 is input for displaying the preview of the print data in the selected state (S1210) will be described later. A case where the input from the operation panel IF 315 is input for confirming/changing the print settings of the print data in the selected state (S1211) will be described later. In a case where the input from the operation panel IF 315 is input for deleting the print data in the selected state (S1212), the saved job control unit 357 deletes, from the HDD 313, the selected print data and the bibliographic information corresponding thereto (S1213). In a case where the input from the operation panel IF 315 is input for ending displaying of the currently-displayed user interface screen (S1214), the saved job control unit 357 closes the displayed user interface screen to end a series of processing (S1215).

Figure 13:
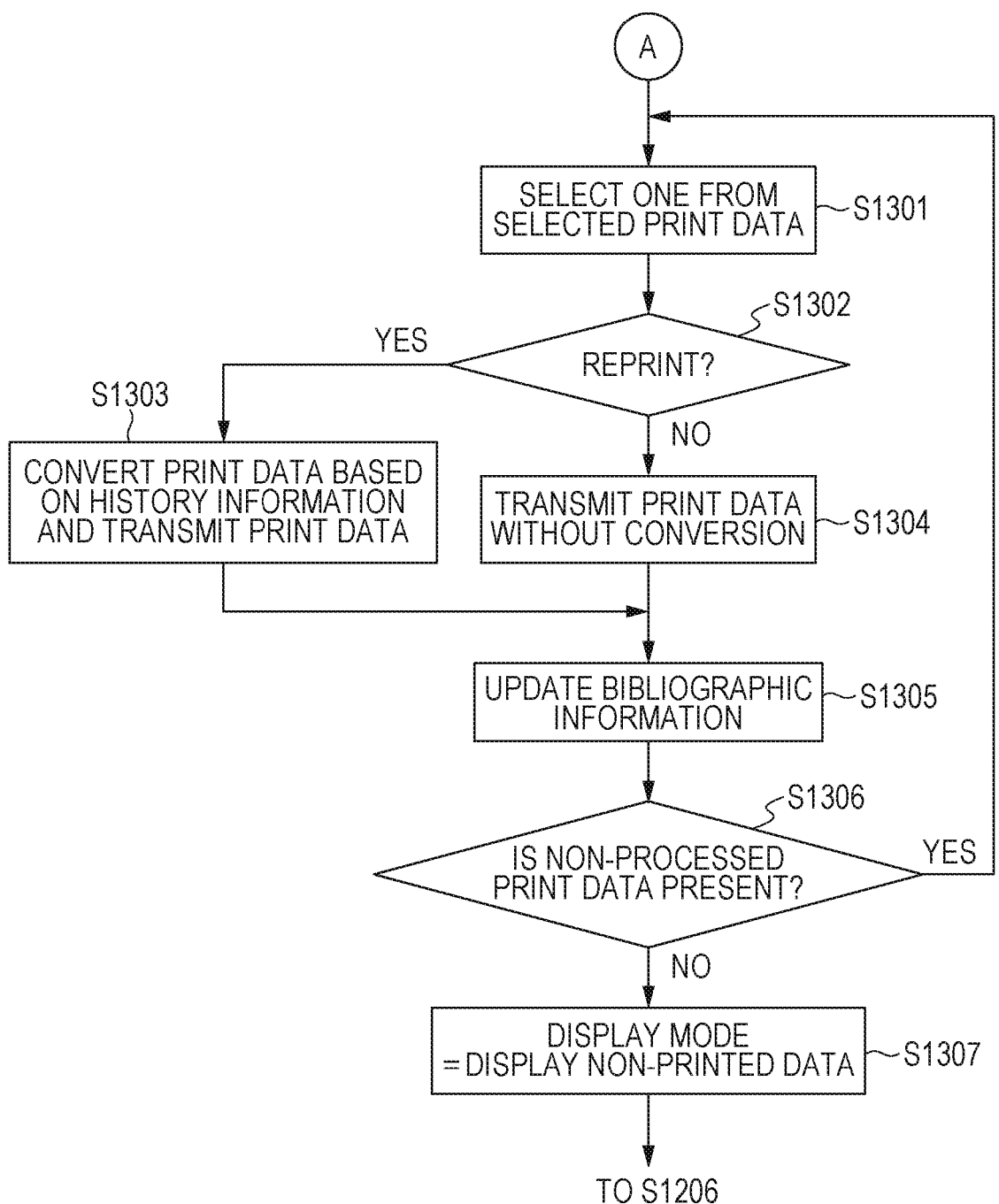
FIG. 13 is a chart of an operation flow upon printing.

Subsequently, processing when the saved job control unit 357 receives the input for printing the print data in the selected state will be described with reference to FIG. 13. FIG. 13 is a chart of an operation flow upon printing.

First, in a case where there are multiple pieces of the print data in the selected state in the flowchart of FIG. 12, the saved job control unit 357 selects one of the print data pieces (S1301). For example, the order of selecting the print data is stored in the RAM 314, and selection is started from the print data selected earlier. Subsequently, the saved job control unit 357 determines, based on the bibliographic information, whether the selected print data is printed or non-printed (S1302). In the case of reprinting, the saved job control unit 357 transmits, to a print data conversion unit 358, the print data corresponding to the bibliographic information read from the HDD and print setting history information (453 of FIG. 4B) of the bibliographic information, and then, converts the print data. Thereafter, the converted print data is transmitted to a print processing unit 359 (S1303). In the case of the non-printed print data, the print data corresponding to the bibliographic information is, without conversion of the print data, transmitted from the HDD to the print processing unit 359 (S1304). Subsequently, the saved job control unit 357 updates the print setting history (453 of FIG. 4B) of the bibliographic information corresponding to the printed print data and the status (452 of FIG. 4B) of the print data (S1305). The above-described processing is repeated the number of times corresponding to the selected print data (S1306). When the processing for all pieces of the print data is completed, the saved job control unit 357 switches the settings such that the type of print data displayed on the user interface is switched to the printed print data.

Figure 14:
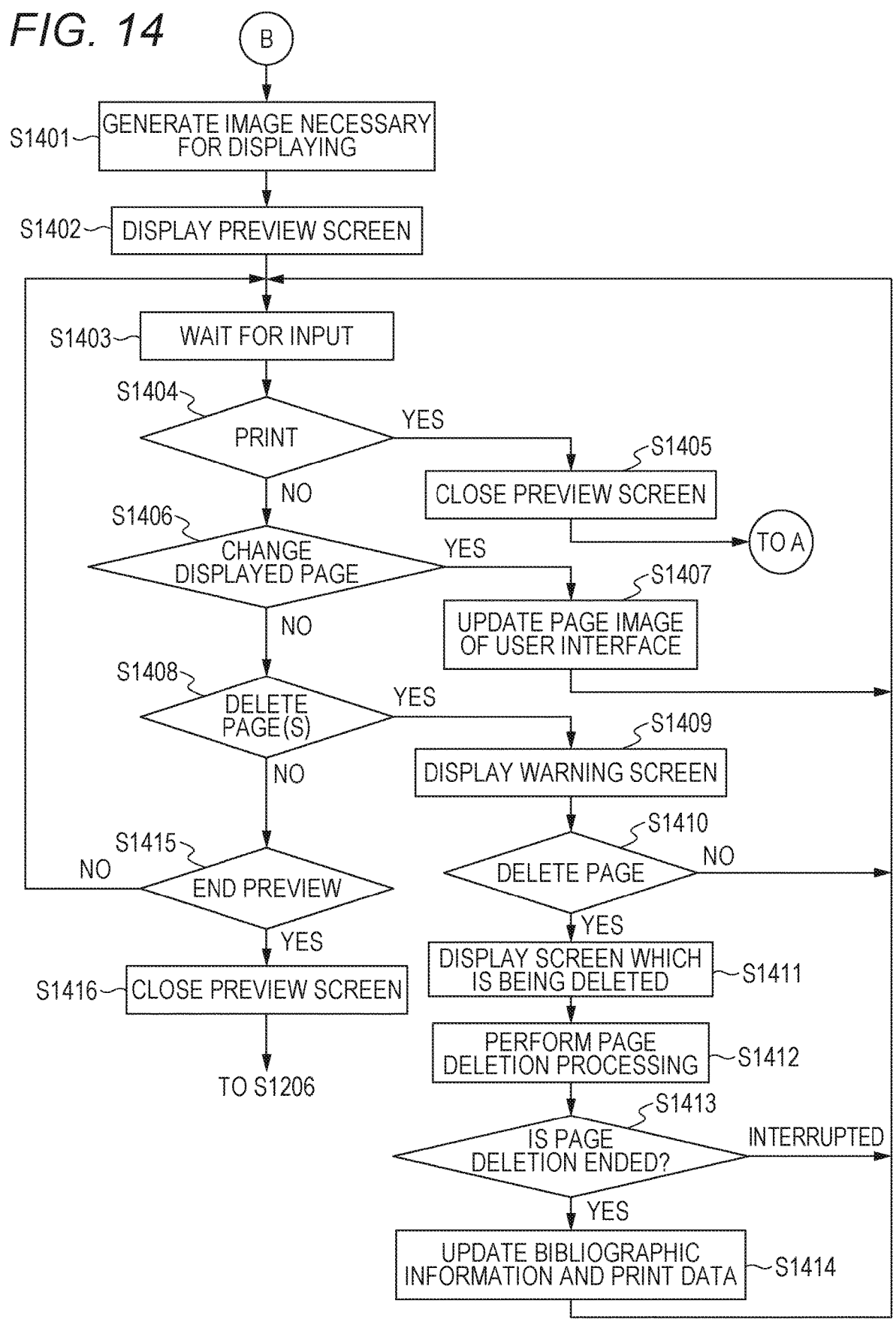
FIG. 14 is a chart of an operation flow upon previewing.

Subsequently, processing when the saved job control unit 357 receives the input for previewing the print data in the selected state will be described with reference to FIG. 14. FIG. 14 is a chart of an operation flow upon previewing.

Note that the preview of the print data can be accepted for a single piece of the print data. Thus, in a case where multiple pieces of the print data are selected, the saved job control unit 357 may edit the user interface such that no input for previewing is made.

First, the saved job control unit 357 generates, based on the selected print data, multiple images including an image to be displayed first (S1401). In the present embodiment, an image corresponding to three pages from an initial position of the print data is generated as the image to be displayed first, but the image may correspond to any page. Moreover, for the image generated at this point, a page image is generated with reference to only a PDL portion (420 of FIG. 4A) of the print data. Subsequently, the saved job control unit 357 generates and displays the preview screen as the user interface screen including at least one page of the image generated at S1401 (S1402). Subsequently, the saved job control unit 357 stands by until receiving the input from the operation panel IF 315 (S1403). In a case where the input from the operation panel IF 315 is the input for printing the selected print data (S1404), the saved job control unit 357 closes the preview screen (S1405), and performs the processing described with reference to FIG. 13. In a case where the input from the operation panel IF 315 is the input for changing the displayed page (S1406), the saved job control unit 357 updates, based on the input, the preview image such that the displayed page is changed (S1407). If the page targeted for a display change is not generated at S1401, the saved job control unit 357 generates the corresponding page based on the print data. In a case where the input from the operation panel IF 315 is the input for deleting the page corresponding to the displayed image (S1408), the saved job control unit 357 displays the dialogue screen for warning that the page corresponding to the displayed image is to be deleted from the print data (S1409). In this manner, a print job change undesired by the user can be prevented. Subsequently, when the input for executing page deletion is detected, the saved job control unit 357 closes the dialogue screen displayed at S1409, and displays the dialogue screen indicating that page deletion is being executed (S1411). Note that this screen can receive interruption of the page deletion processing. Subsequently, the saved job control unit 357 notifies the print data conversion unit 358 of the selected print data, and in this manner, executes the processing of deleting the specified page(s) (S1412). In a case where interruption of the page deletion processing is received before completion of the page deletion processing, the saved job control unit 357 closes the screen displayed at S1411, and interrupts the page deletion processing (S1413). When the page deletion processing ends, the saved job control unit 357 closes the screen displayed at S1411, and updates the bibliographic information and the print data saved in the HDD 313 (S1414). That is, the saved job control unit 357 overwrites the original print data with the print data converted by the print data conversion unit 358. Further, the saved job control unit 357 notifies a data interpretation unit 354 of the converted data, and in this manner, re-extracts part of print data information to update the print data information (451 of FIG. 4B) and the print setting history information (453 of FIG. 4B) of the bibliographic information. Such processing is performed because part (e.g., a page number or a color mode) of the print data information might be changed due to the page deletion processing.

Moreover, this is because in a case where the print settings include the specified print range, if the page(s) deleted at S1412 relates to the specified print range, the specified print range needs to be corrected. That is, suppose that there is print data including first to fifth pages and the second to third pages are specified as a specified print range. When such printed data is printed with the first page being deleted, the third and fourth pages of the original print data are output, and such printing might not follow user's intention (see FIG. 17). FIG. 17 is a diagram of a problem in the case of applying both of page deletion and print range specification. In the present embodiment, in the case of executing the page deletion processing, the specified print range is initialized (i.e., resetting is performed such that all pages of document data are to be printed). In a case where the input from the operation panel IF 315 is the input for closing the preview screen (S1415), the saved job control unit 357 closes the preview image to end a series of preview processing (S1416).

Figure 15:
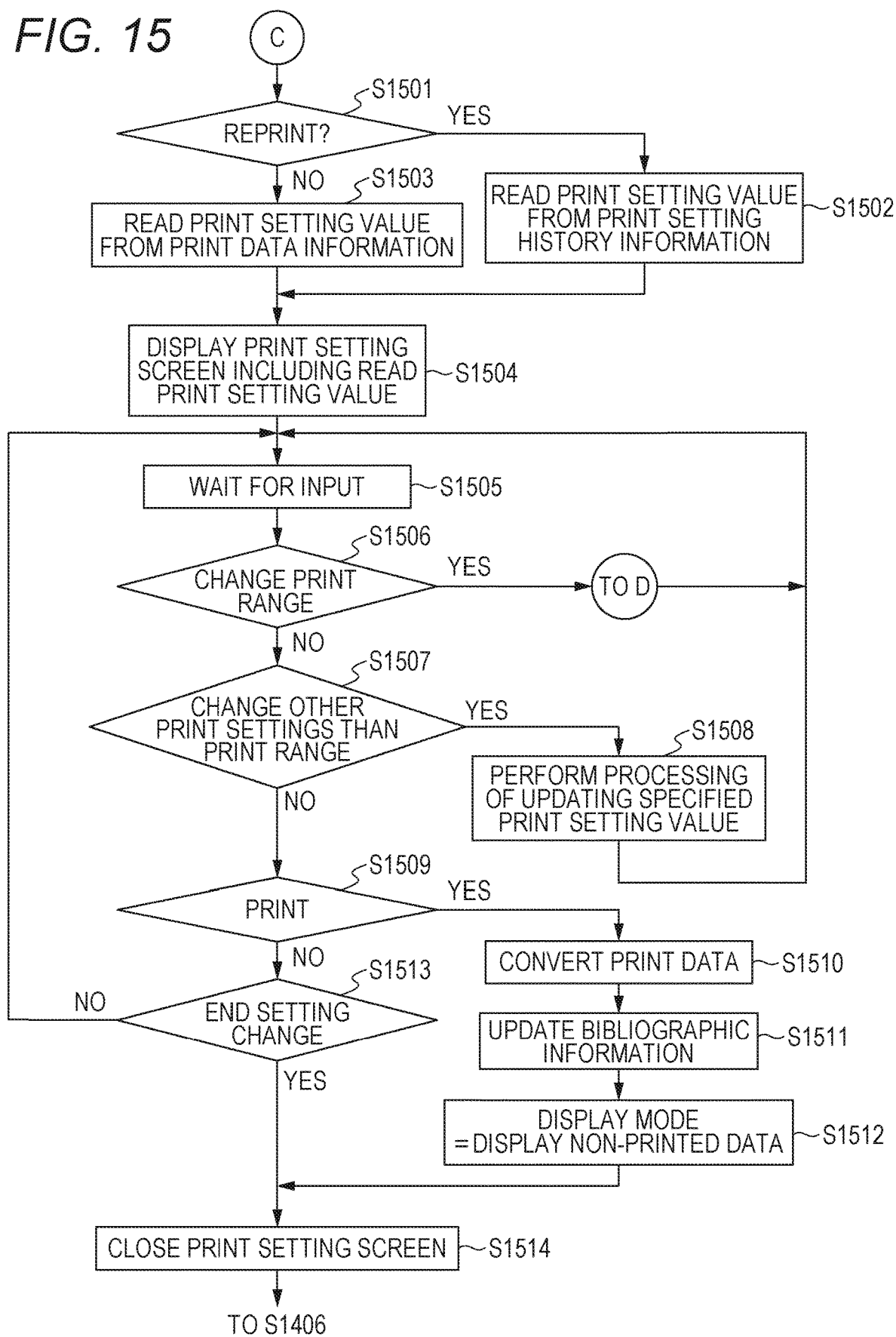
FIG. 15 is a chart of an operation flow upon print setting.

Subsequently, processing when the saved job control unit 357 converts the print data by means of the print data conversion unit 358 will be described with reference to FIG. 15. FIG. 15 is a chart of an operation flow upon print setting. Note that the print data conversion unit 358 performs only one print data conversion processing at once. Thus, the saved job control unit 357 may edit the user interface such that no input for changing the print settings is made in a case where multiple pieces of the print data are selected.

First, the saved job control unit 357 determines, from the bibliographic information corresponding to the specified print data, whether such print data is printed or non-printed (S1501). In the case of the printed print data, the saved job control unit 357 stores, in the RAM 314, the print setting information from the print setting history information (453 of FIG. 4B) of the bibliographic information (S1502). In the case of the non-printed print data, the saved job control unit 357 reads, in the RAM 314, the print setting information from the print data information (451 of FIG. 4B) of the bibliographic information (S1503). Subsequently, the saved job control unit 357 generates and displays, based on the print setting information read in the RAM, the print setting screen as the user interface screen for receiving a change in the print settings (S1504). Subsequently, the saved job control unit 357 stands by until receiving the input from the operation panel IF 315 (S1505). A case where the input from the operation panel IF 315 is input for changing the print range of the selected print data (S1506) will be described later. In a case where the input from the operation panel IF 315 is input for changing other print settings than the print range of the selected print data (S1507), the saved job control unit 357 displays a screen for changing each print setting to receive the input. Thereafter, the saved job control unit 357 changes, based on the received value, the print setting information stored in the RAM 314 (S1508). In a case where the input from the operation panel IF 315 is the input for printing the selected print data (S1509), the saved job control unit 357 transmits the selected print data and the print setting information to the print data conversion unit 358, thereby converting the print data. Thereafter, the converted print data is transmitted to the print processing unit 359 (S910). Subsequently, the saved job control unit 357 updates, based on the print setting information, the print setting history information (453 of FIG. 4B) of the corresponding bibliographic information. Further, the status (452 of FIG. 4B) of the print data is updated (S911). Thereafter, the saved job control unit 357 switches the settings such that the type of print data displayed on the user interface is switched to the printed print data (S912). In a case where the input from the operation panel IF 315 is input for closing the print setting screen (S913) or a case where a series of print processing is executed, the saved job control unit 357 closes the print setting screen (S914).

Figure 16:
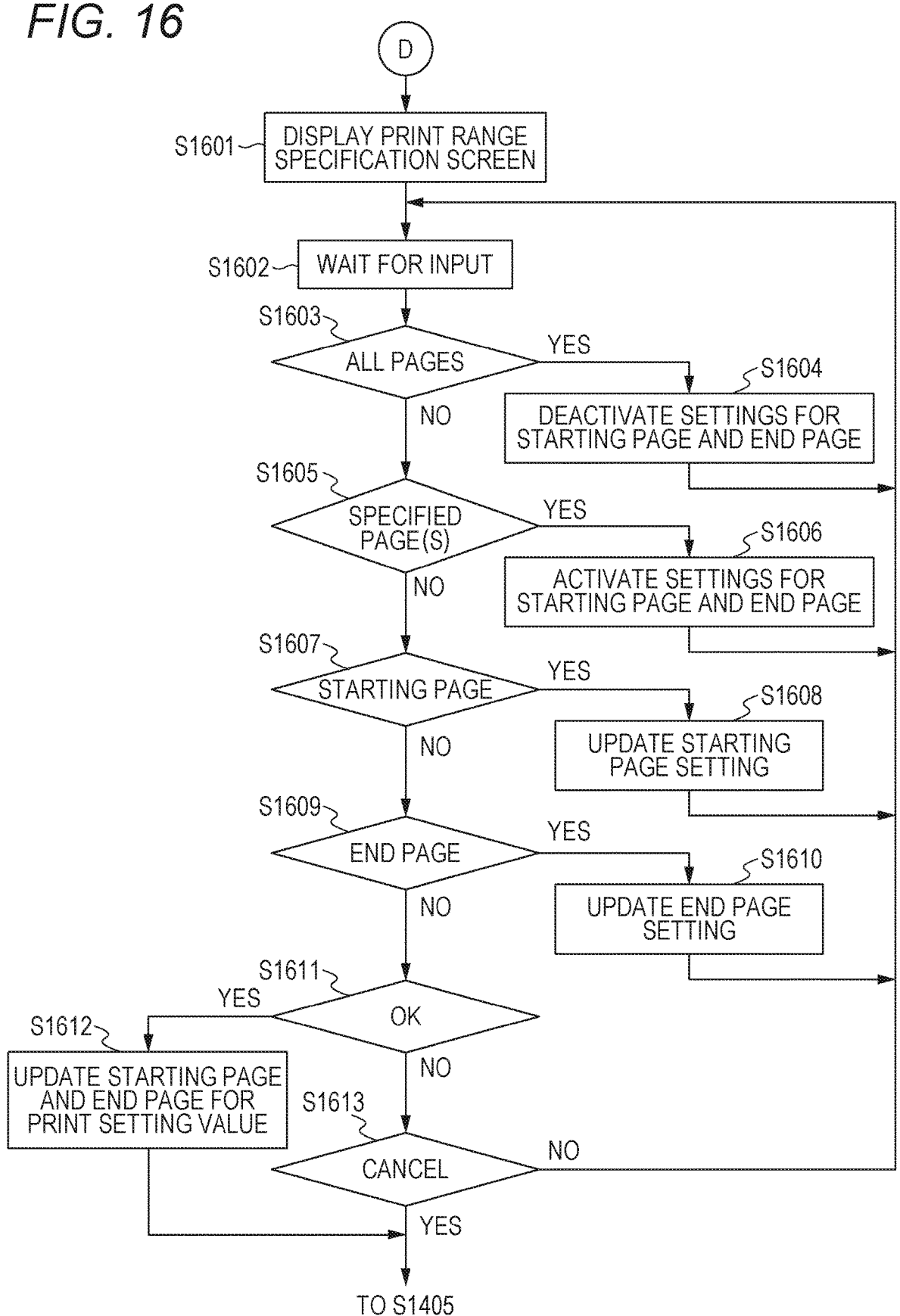
FIG. 16 is a chart of an operation flow upon a print range change.

Subsequently, processing when the saved job control unit 357 receives input for changing a print range setting of the print data in the selected state will be described with reference to FIG. 16. FIG. 16 is a chart of an operation flow upon a print range change.

First, the saved job control unit 357 generates and displays the user interface screen for changing the specified print range (S1601). This screen is preferably generated based on the print setting information read in the RAM 314. Further, the saved job control unit 357 stores, in the RAM 314, a copy of information for specifying the print range from the print setting information read in the RAM 314. Note that the information for specifying the print range includes two parameters of a starting page and an end page. In a case where the end page is zero, the end page means a final page. Subsequently, the saved job control unit 357 stands by until receiving the input from the operation panel IF 315 (S1602). In a case where the input from the operation panel IF 315 is input for specifying all pages as the print range (S1603), the saved job control unit 357 edits the copy, which is stored in the RAM 314, of the information for specifying the print range to change the print range to all pages (S1604). Further, the user interface screen for changing the specified print range may be updated such that input for setting the starting page and the end page is not performed. In a case where the input from the operation panel IF 315 is input for specifying the print range (S1605), the saved job control unit 357 controls the user interface screen for changing the specified print range. Thus, the input for setting the starting page and the end page becomes available (S1606). In a case where the input from the operation panel IF 315 is input for setting the starting page of the print range (S1607), the saved job control unit 357 edits the copy, which is stored in the RAM 314, of the information for specifying the print range to change the starting page (S1608). In a case where the input from the operation panel IF 315 is input for setting the end page of the print range (S1609), the saved job control unit 357 edits the copy, which is stored in the RAM 314, of the information for specifying the print range to change the end page (S1610). In a case where the input from the operation panel IF 315 is input for determining the print range setting (S1611), the saved job control unit 357 updates, based on the copy of the information for specifying the print range, the print setting information read in the RAM 314 (S1612). Thereafter, the user interface screen for changing the specified print range is closed, and a change in the specified print range ends. In a case where the input from the operation panel IF 315 is input for interrupting the print range setting (S1613), the saved job control unit 357 rejects the copy, which is stored in the RAM 314, of the information for specifying the print range. Thereafter, the user interface screen for changing the specified print range is closed, and a change in the specified print range ends.

[Advantageous Effects]

According to one or more aspects of the present disclosure, the printer 102 can set the function of holding the specified print range and the page deactivation function on separate screens. Thus, the user less mixes up these functions upon utilization thereof.

According to one or more aspects of the present disclosure, the printer 102 can set the page deactivation function on the preview screen. Thus, the user deactivates the page(s) after the preview has been confirmed. Thus, the erroneous operation of deactivating a page(s) can be reduced.

According to one or more aspects of the present disclosure, the printer 102 can collectively apply the specified print range to multiple pages, and on the other hand, page deactivation is applied one by one. Thus, the erroneous operation of deactivating a page(s) can be reduced.

Other Embodiments

In the first embodiment, the print settings are held (S224) after execution of printing (S223). However, holding of the print settings may be performed before execution of printing. That is, at the stage of designating holding of the specified print range, the print range change field 467 may store the specified print range information.

In the first embodiment, page deactivation processing is performed (S234) after execution of printing (S233). However, page deactivation may be performed before execution of printing. That is, at the stage of designating page deactivation, specific page information of the print data may be deleted.

The present disclosure can be also implemented in such a manner that a program for implementing one or more functions of the above-described embodiments is supplied to a system or a device via a network or a storage medium and one or more processors in a computer of the system or the device reads and executes the program. Alternatively, the present disclosure can be also implemented by a circuit (e.g., ASIC or the like) for implementing one or more functions.

Moreover, the present disclosure may be applied to a system including multiple types of equipment, or may be applied to a device including one type of equipment. For example, the functions may be implemented in such a manner that some of the modules described in the software 350 are executed by an external server and a result of processing by the external server is acquired. For example, the job storage unit configured to store the print data may be provided in the external server.

The present disclosure is not limited to the above-described embodiments. Various modifications (including an organic combination of the embodiments) are available based on the gist of the present disclosure, and are not excluded from the scope of the present disclosure. That is, configurations with combinations of the above-described embodiments and variations thereof are all included in the present disclosure.

Note that definitions of abbreviated expressions described in each embodiment are as follows. ASIC is an application specific integrated circuit. CPU is a central processing unit. FAX is a facsimile. LAN is a local area network. MFP is a multi function peripheral. PC is a personal computer. PDL is a page description language. RAM is a random access memory. ROM is a read only memory. SFP is a single function peripheral. UI is a user interface. USB is a universal serial bus. IF is an interface.

According to each of the above-described embodiments, the image formation device can be provided, which can be utilized for changing the page range to be printed and repeatedly printing a single type of print data and which can exclude a specific page(s) from the changed page range.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority of Japanese Patent Application No. 2017-199718, filed Oct. 13, 2017, which is hereby incorporated by reference herein in its entirety.

What is claimed is:

1. A printing apparatus comprising:
a user interface;
one or more memories storing instructions; and
one or more processors executing the instructions to:
receive print data including multiple pages;

store the received print data in a storage device;

receive a first specification of one or more pages among the multiple pages of the stored print data by the user interface, wherein the first specification is a specification for changing print setting information associated with the stored print data, and wherein the one or more pages corresponding to the first specification are to be printed;

receive a second specification of one or more pages among the multiple pages of the stored print data by the user interface, wherein the one or more pages corresponding to the second specification are to be deleted;

print, in a case where the first specification about the stored print data has been received, the one or more pages corresponding to the first specification based on a print instruction of the stored print data, wherein print data including the multiple pages remains in the storage device after printing the one or more pages; and delete, in a case where the second specification about the stored print data has been received, the one or more pages corresponding to the second specification, wherein print data, which does not include the deleted one or more pages and includes pages other than the one or more pages among the multiple pages, remains in the storage device after deleting the one or more pages.

2. The printing apparatus according to claim 1, wherein, in a case where the first specification of the one or more pages to be printed has been received as a print setting by the user interface, the print setting is stored in the storage device and the print data including the multiple pages remains in the storage device.

3. The printing apparatus according to claim 1, wherein, in a case where the print setting indicating the first specification of the one or more pages to be printed is stored in the storage device and the print data including the multiple pages remains in the storage device, the print setting indicating the first specification of the one or more pages to be printed is displayed in a print setting screen for printing the print data including the multiple pages.

4. The printing apparatus according to claim 3, wherein the instructions further cause the printing apparatus to:

notify a user by the user interface that, in a case where the second specification about the print data has been received.

5. A control method for a printing apparatus, the control method comprising:

receiving print data including multiple pages from an external device;

storing the received print data in a storage device;

receiving a first specification of one or more pages among the multiple pages of the stored print data by a user interface of the printing apparatus, wherein the first specification is a specification for changing print setting information associated with the stored print data, and wherein the one or more pages corresponding to the first specification are to be printed;

receiving a second specification of one or more pages among the multiple pages of the stored print data by the user interface, wherein the one or more pages corresponding to the second specification are to be deleted;

printing, in a case where the first specification about the stored print data has been received, the one or more pages corresponding to the first specification based on a print instruction of the stored print data, wherein print data including the multiple pages remains in the storage device after printing the one or more pages; and deleting, in a case where the second specification about the stored print data has been received, the one or more pages corresponding to the second specification, wherein print data, which does not include the deleted one or more pages and includes pages other than the one or more pages among the multiple pages, remains in the storage device after deleting the one or more pages.

6. A non-transitory computer-readable storage medium storing a control program causing a computer to execute a control method for a printing apparatus, the control method comprising:

receiving print data including multiple pages from an external device;

storing the received print data in a storage device;

receiving a first specification of one or more pages among the multiple pages of the stored print data by a user interface of the printing apparatus, wherein the first specification is a specification for changing print setting information associated with the stored print data, and wherein the one or more pages corresponding to the first specification are to be printed;

receiving a second specification of one or more pages among the multiple pages of the stored print data by the user interface, wherein the one or more pages corresponding to the second specification are to be deleted;

printing, in a case where the first specification about the stored print data has been received, the one or more pages corresponding to the first specification based on a print instruction of the stored print data, wherein print data including the multiple pages remains in the storage device after printing the one or more pages; and deleting, in a case where the second specification about the stored print data has been received, the one or more pages corresponding to the second specification, wherein print data, which does not include the deleted one or more pages and includes pages other than the one or more pages among the multiple pages, remains in the storage device after deleting the one or more pages.

7. The printing apparatus according to claim 1, wherein the multiple pages can be printed by printing the stored print data including the multiple pages, and wherein the one or more pages, which are different from the deleted pages, can be printed by printing the part of the print data remaining in the storage device.

8. The printing apparatus according to claim 3, wherein the processors further execute the instructions to manage print range change information as bibliographic information of the stored print data, and wherein, in a case where a specification of a deletion of pages other than the one or more pages has been received by the user interface, a number of pages of the stored print data before deleting the pages other than the one or more pages and a number of pages of the stored print data after deleting the pages other than the one or more pages are managed as the print range change information.

9. The printing apparatus according to claim 1, wherein the first specification is a specification of a print range including the one or more pages among the multiple pages of the stored print data.

10. The printing apparatus according to claim 9, wherein a starting page of the print range and an end page of the print range are specified as the first specification by the user interface.

11. The printing apparatus according to claim 1, wherein the print setting information further includes at least one of color setting, double-sided print setting and N on 1 setting.

12. A printing apparatus comprising:
one or more memories storing instructions; and
one or more processors executing the instructions to:
receive print data including multiple pages from an external device;
store the received print data in a storage device;
receive a first specification of a print range including at least two pages among the multiple pages of the stored print data, wherein the at least two pages included in the print range corresponding to the first specification are to be printed;
receive a second specification of one or more pages among the multiple pages of the stored print data, wherein the one or more pages corresponding to the second specification are to be deleted;
print, in a case where the first specification about the stored print data has been received, the at least two pages included in the print range corresponding to the first specification based on a print instruction of the stored print data, wherein print data including the multiple pages remains in the storage device after printing the at least two pages; and
delete, in a case where the second specification about the stored print data has been received, the one or more pages corresponding to the second specification, wherein print data, which does not include the deleted one or more pages and includes pages other than the one or more pages among the multiple pages, remains in the storage device after deleting the one or more pages.

* * * * *